(12) United States Patent
Ishiguro

(10) Patent No.: US 9,919,429 B2
(45) Date of Patent: Mar. 20, 2018

(54) ROBOT, CONTROL METHOD, AND PROGRAM

(71) Applicant: NEC Corporation, Minato-ku, Tokyo (JP)

(72) Inventor: Shin Ishiguro, Tokyo (JP)

(73) Assignee: NEC CORPORATION, Tokyo (JP)

( * ) Notice: Subject to any disclaimer, the term of this patent is extended or adjusted under 35 U.S.C. 154(b) by 40 days.

(21) Appl. No.: 15/023,023

(22) PCT Filed: Sep. 9, 2014

(86) PCT No.: PCT/JP2014/073745
§ 371 (c)(1),
(2) Date: Mar. 18, 2016

(87) PCT Pub. No.: WO2015/045844
PCT Pub. Date: Apr. 2, 2015

(65) Prior Publication Data
US 2016/0229063 A1     Aug. 11, 2016

(30) Foreign Application Priority Data

Sep. 27, 2013   (JP) .................................. 2013-200879

(51) Int. Cl.
*B25J 11/00* (2006.01)
*B25J 13/08* (2006.01)
*G01J 5/00* (2006.01)

(52) U.S. Cl.
CPC ......... *B25J 13/087* (2013.01); *B25J 11/0015* (2013.01); *G01J 5/0025* (2013.01)

(58) Field of Classification Search
CPC ...... B25J 9/1602; B25J 11/0005; B25J 13/08; B25J 11/0015; B25J 13/087;
(Continued)

(56) References Cited

U.S. PATENT DOCUMENTS 8,010,231 B2 *   8/2011   Sumida .................. G06N 3/008
                                                  700/253
9,552,056 B1 *   1/2017   Barry ....................... G06F 3/01

FOREIGN PATENT DOCUMENTS

JP       10-259943 A      9/1998
JP       2004-034274 A    2/2004
(Continued)

OTHER PUBLICATIONS

Japanese Office Action for JP Application No. 2015-539079 dated Aug. 16, 2016 with English Translation.
(Continued)

*Primary Examiner* — Dalena Tran

(57) ABSTRACT

A robot (2000) includes a face unit (2020), a temperature distribution detection unit (2040), a head direction calculation unit (2060), and a first face direction change unit (2080). The temperature distribution detection unit (2040) includes a plurality of photo-detectors disposed in a grid form. The temperature distribution detection unit (2040) detects a temperature distribution of a detection region by using the plurality of photo-detectors. The head direction calculation unit (2060) calculates a direction in which a person's head is located, on the basis of the temperature distribution detected by the temperature distribution detection unit (2040). The first face direction change unit (2080) directs the face unit (2020) in the direction calculated by the head direction calculation unit (2060).

18 Claims, 18 Drawing Sheets

(58) Field of Classification Search
CPC . Y10S 901/01; Y10S 901/47; G06K 9/00228;
G06K 9/00362; G06K 9/00805; G06K
9/4671; G06T 2207/10048; G06T
2207/20224; G06T 7/11; G06T 7/174
USPC .................................. 700/259; 382/103, 173
See application file for complete search history.

(56) References Cited

FOREIGN PATENT DOCUMENTS

| | | |
|---|---|---|
| JP | 2004-042151 A | 2/2004 |
| JP | 2005-238382 A | 9/2005 |
| JP | 2008-215953 A | 9/2008 |
| JP | 2010-230392 A | 10/2010 |
| JP | 2012-042131 A | 3/2012 |
| JP | 2012-215959 A | 11/2012 |
| JP | 2013-099800 A | 5/2013 |

OTHER PUBLICATIONS

International Search Report for PCT Application No. PCT/JP2014/073145, dated Nov. 18, 2014.

\* cited by examiner

FIG. 4
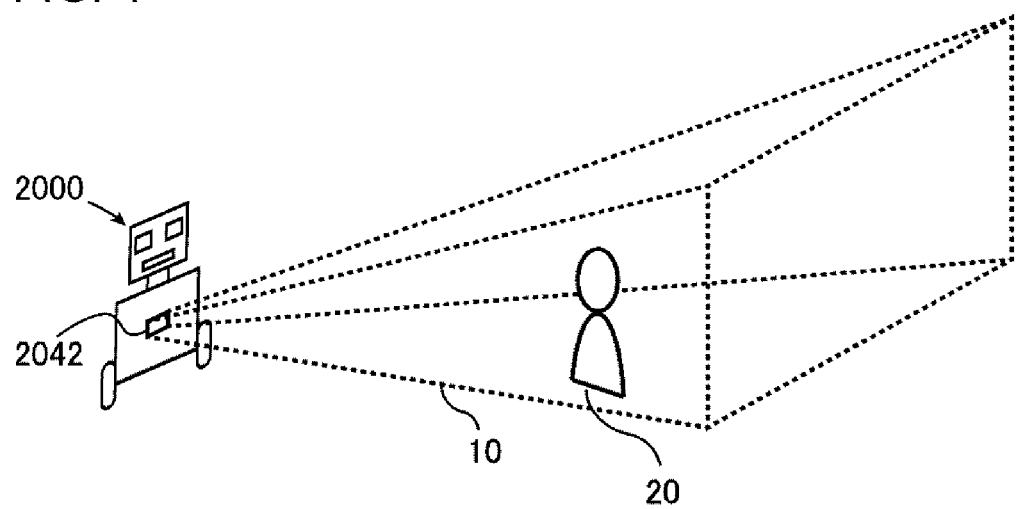
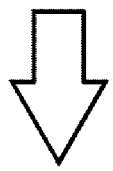
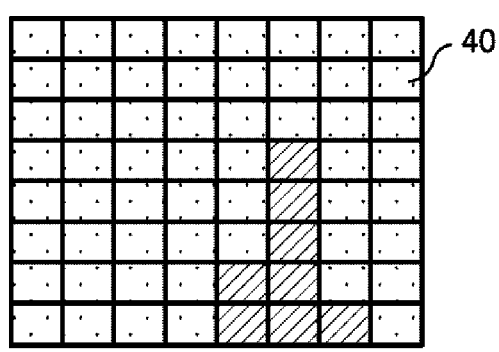

FIG. 11
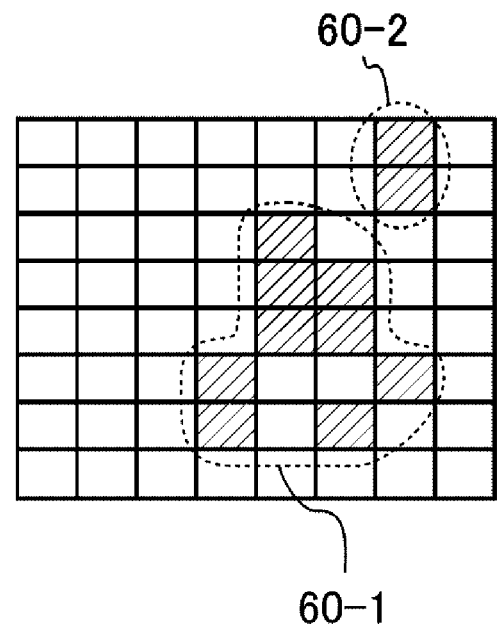
(a)
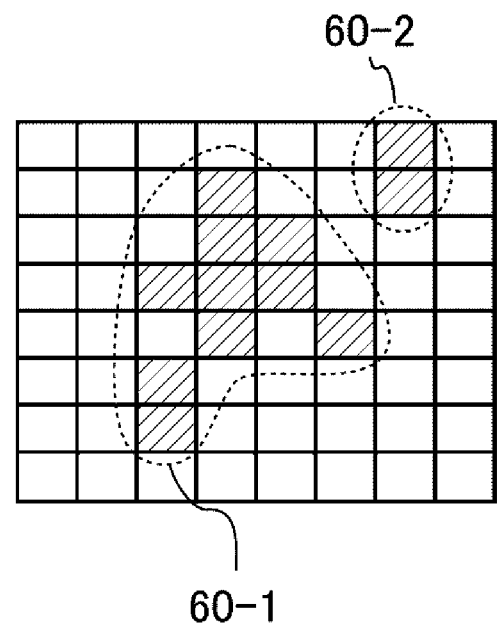
(b)

ROBOT, CONTROL METHOD, AND PROGRAM

This application is a National Stage Entry of PCT/JP2014/073745 filed on Sep. 9, 2014, which claims priority from Japanese Patent Application 2013-200879 filed on Sep. 27, 2013, the contents of all of which are incorporated herein by reference, in their entirety.

TECHNICAL FIELD

The present invention relates to a robot, a control method, and a program.

BACKGROUND ART

A robot performing communication with a person has been developed. For example, there is a nursing care robot or an education robot. Such a robot performs an operation such as "making a response to a request from a person with sound voice".

It is important for a robot performing communication with a person to perform natural communication without making the person feel uncomfortable. Therefore, a technique which enables a robot to perform natural communication with a person has been developed.

In a robot disclosed in Patent Document 1, a person's face is detected from an image obtained by capturing the surroundings, and the eyes or a head of the robot is directed in a direction of the face so that communication is started.

In a robot disclosed in Patent Document 2, a person's face is detected from an image obtained by capturing the surroundings, a degree of matching between eyesight of the person and eyesight of the robot is increased by tracking the person's face, and then a service is provided to the person.

Patent Document 3 discloses a robot that calculates a forward facing direction of a person's face or body from an image obtained by imaging the surroundings, moves toward the front side of the person's face or body, and then has conversations with the person.

Patent Document 4 discloses a human body detection apparatus that detects whether or not an object is a person on the basis of a height and a temperature of the object. The human body detection apparatus handles an object as a person if a height of the target object is larger than a predetermined height, and a temperature of the target object is higher than a predetermined temperature. The human body detection apparatus differentiates a small animal, an instrument, and a person from each other by comparing a height of an object with a predetermined height.

RELATED DOCUMENT

Patent Document

[Patent Document 1] Japanese Unexamined Patent Application Publication No. 2004-42151
[Patent Document 2] Japanese Unexamined Patent Application Publication No. 2013-99800
[Patent Document 3] Japanese Unexamined Patent Application Publication No. 2004-34274
[Patent Document 4] Japanese Unexamined Patent Application Publication No. 2008-215953

SUMMARY OF THE INVENTION

The present inventor has examined a method in which a robot can more reliably perform natural communication with a person. The robots disclosed in Patent Documents 1 to 3 would perform natural communication with a person by detecting the face of the person. However, it is hard for such robots to detect a person's face and to therefore perform natural communication with the person.

Each of the robots disclosed in Patent Documents 1 to 3 detects a person's face from an image of the surroundings. For this reason, for example, if the person directs in a direction opposite to the robot, it is hard for the robot to detect the person's face from the image of the surroundings. In addition, for example, if a picture of a person is captured in an image of the surroundings, such a robot may wrongly detect the face in the picture as a real person's face. Further, if such a robot is located in a dark place, it is hard to detect a person's face from an image of the surroundings.

If the human body detection apparatus disclosed in Patent Document 4 is applied to a robot, the robot performs would natural communication with a person by detecting the person. However, it may be hard for the human body detection apparatus to detect a person. The human body detection apparatus differentiates a small animal, an instrument, and a person from each other by comparing a height of an object with a predetermined height. Here, in order to differentiate a small animal, an instrument, and a person from each other, it is required to set the predetermined height used for determination as a value above a certain height. Thus, if a person has a low posture (for example, when the person crouches), the human body detection apparatus may not detect the person.

The present invention has been made in consideration of these circumstances. An object of the present invention is to provide a technique of enabling a robot to more reliably perform natural communication with a person.

According to the present invention, there is provided a robot including a face unit; a temperature distribution detection unit that detects a temperature distribution of a detection region by using a plurality of photo-detectors disposed in a grid form; a head direction calculation unit that calculates a direction in which a person's head is located on the basis of the temperature distribution; and a first face direction change unit that directs the face unit in the direction calculated by the head direction calculation unit.

According to the present invention, there is provided a control method executed by a computer controlling a robot. The robot includes a face unit, and a temperature distribution detection unit that detects a temperature distribution of a detection region by using a plurality of photo-detectors disposed in a grid form. The control method includes a head direction calculation step of calculating a direction in which a person's head is located on the basis of the temperature distribution; and a first face direction change step of directing the face unit in the direction calculated in the head direction calculation step.

According to the present invention, there is a program causing a computer to have a function of each functional constituent unit of the robot provided by the present invention, and thus the computer has a function of being operated as the robot provided by the present invention.

According to the present invention, there is provided a technique of enabling a robot to more reliably perform natural communication with a person.

BRIEF DESCRIPTION OF THE DRAWINGS

The above-described object, and other objects, features and advantages will become more apparent from preferred exemplary embodiments described below and the following drawings accompanying the exemplary embodiments.

FIG. 4 is a diagram illustrating a state in which a temperature distribution of a detection region is detected by a temperature distribution detection unit provided with an 8×8 grid-type sensor.

FIG. 11 shows diagrams illustrating groups formed by candidate cells included in a temperature distribution.

DESCRIPTION OF EXEMPLARY EMBODIMENTS

Figure 1:
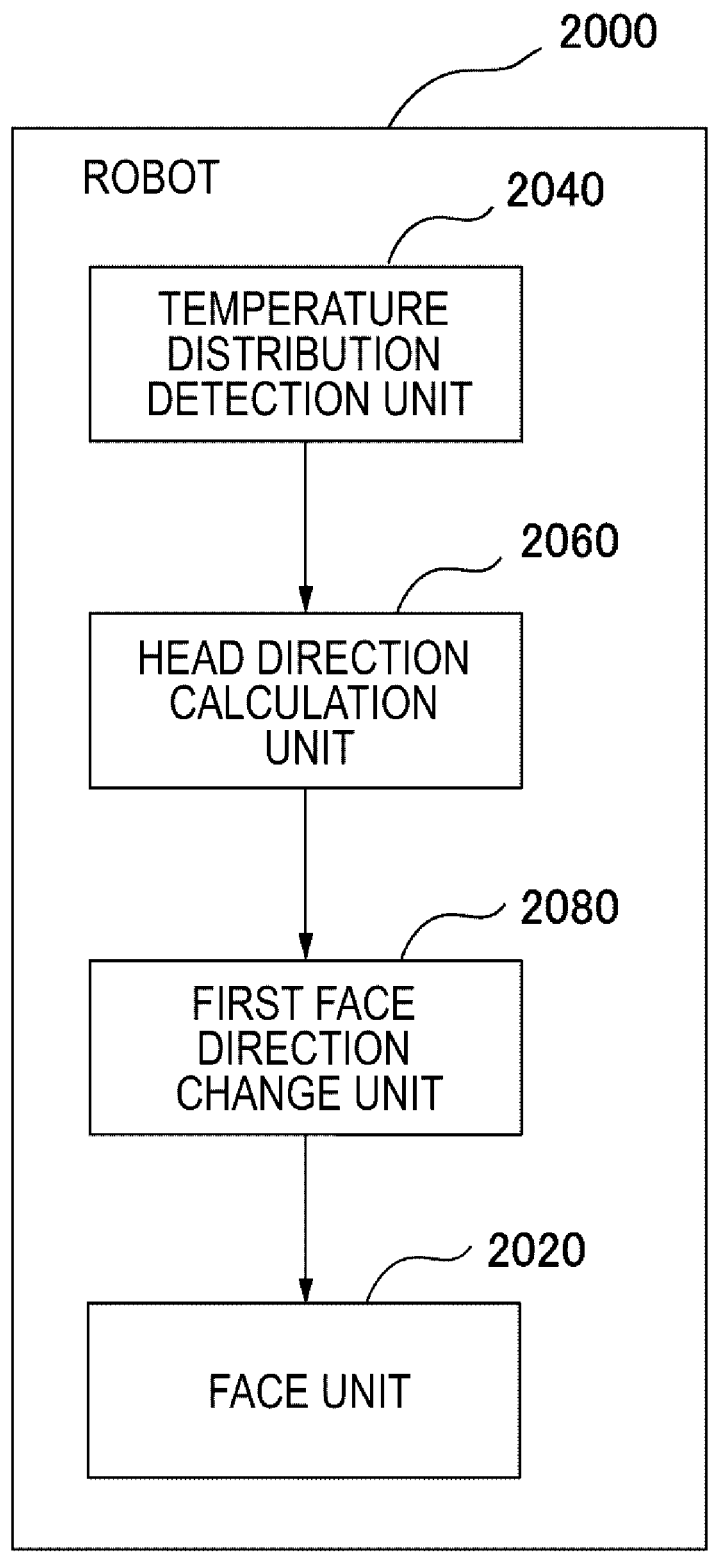
FIG. 1 is a block diagram illustrating a robot according to Exemplary embodiment 1.

Hereinafter, exemplary embodiments of the present invention will be described with reference to the drawings. In addition, the same constituent elements are given the same reference numerals throughout all the drawings, and description thereof will not be repeated.

[Exemplary Embodiment 1]

FIG. 1 is a block diagram illustrating a robot 2000 according to Exemplary embodiment 1. In FIG. 1, an arrow indicates a flow of information. In addition, in FIG. 1, each block indicates not a configuration in the hardware unit but a configuration in the function unit.

<Overview>

The robot 2000 includes a face unit 2020, a temperature distribution detection unit 2040, a head direction calculation unit 2060, and a first face direction change unit 2080. The temperature distribution detection unit 2040 includes a plurality of photo-detectors, which are disposed in a grid form. The temperature distribution detection unit 2040 detects a temperature distribution of a detection region by using the plurality of photo-detectors. The head direction calculation unit 2060 calculates a direction in which a person's head is located based on the temperature distribution detected by the temperature distribution detection unit 2040. The first face direction change unit 2080 directs the face unit 2020 in the direction calculated by the head direction calculation unit 2060.

<Advantageous Effects>

As mentioned above, the robot 2000 of the present exemplary embodiment detects a temperature distribution of a detection region by using the temperature distribution detection unit 2040, and detects a direction in which a person's head is located on the basis of the detected temperature distribution. In addition, a direction of the face unit 2020 is changed to the direction of the detected direction of a person's face. The robot 2000 detects the direction in which the person's head is located by using the temperature distribution and can thus detect the direction in which the person's head is located regardless of whether the person's head is directed toward the robot 2000. Therefore, according to the robot 2000 of the present exemplary embodiment, it is possible to detect a direction in which a person's head is located even if a person's face is not directed toward the robot 2000 unlike in the method of detecting a person's face from an image. Thus, according to the robot 2000 of the present exemplary embodiment, the face unit 2020 can be directed in a direction in which a person's head is located with high probability, and thus it is possible to increase a probability that the person and the robot 2000 can perform natural communication with each other.

Here, a direction in which a person's head is located and a direction in which a person's face is located can be said to be substantially the same as each other. In addition, generally, a person tends to be directed toward an object in response to the object being directed toward the person. For this reason, by directing the face unit 2020 of the robot 2000 toward the person's head, it is highly probable that the person's own face will be directed toward the face unit 2020 even if the face unit 2020 is not accurately directed toward the person's face. As a result, the person's face and the face unit 2020 are directed toward each other, and thus the person and the robot 2000 can perform natural communication with each other.

In addition, in a case of using a method of causing a person to be directed toward the robot 2000 by the robot outputting sound or the robot moving to the front of the person, the person may feel discomfort in communication with the robot or may feel forced to perform communication with the robot. Thus, from the person's viewpoint, such communication with the robot is not substantially natural communication. On the other hand, the robot 2000 of the present exemplary embodiment directs the face unit 2020 in a direction in which a person's head is located, and thus the person would voluntarily direct toward the robot 2000. Thus, there is a low probability that the person may feel discomfort in communication with the robot 2000 or feel forced to perform communication with the robot 2000. Therefore, according to the robot 2000 of the present exemplary embodiment, the robot 2000 and the person perform natural communication with each other.

<Hardware Configuration>

The respective functional constituent units of the robot 2000 are implemented as at least a single hardware constituent element alone or in a state in which a plurality of functional constituent units are combined with each other. In addition, for example, the respective functional constituent units are implemented as at least a single software constituent element. Further, for example, each functional constituent unit may be implemented by a combination of a hardware constituent element and a software constituent element.

Figure 2:
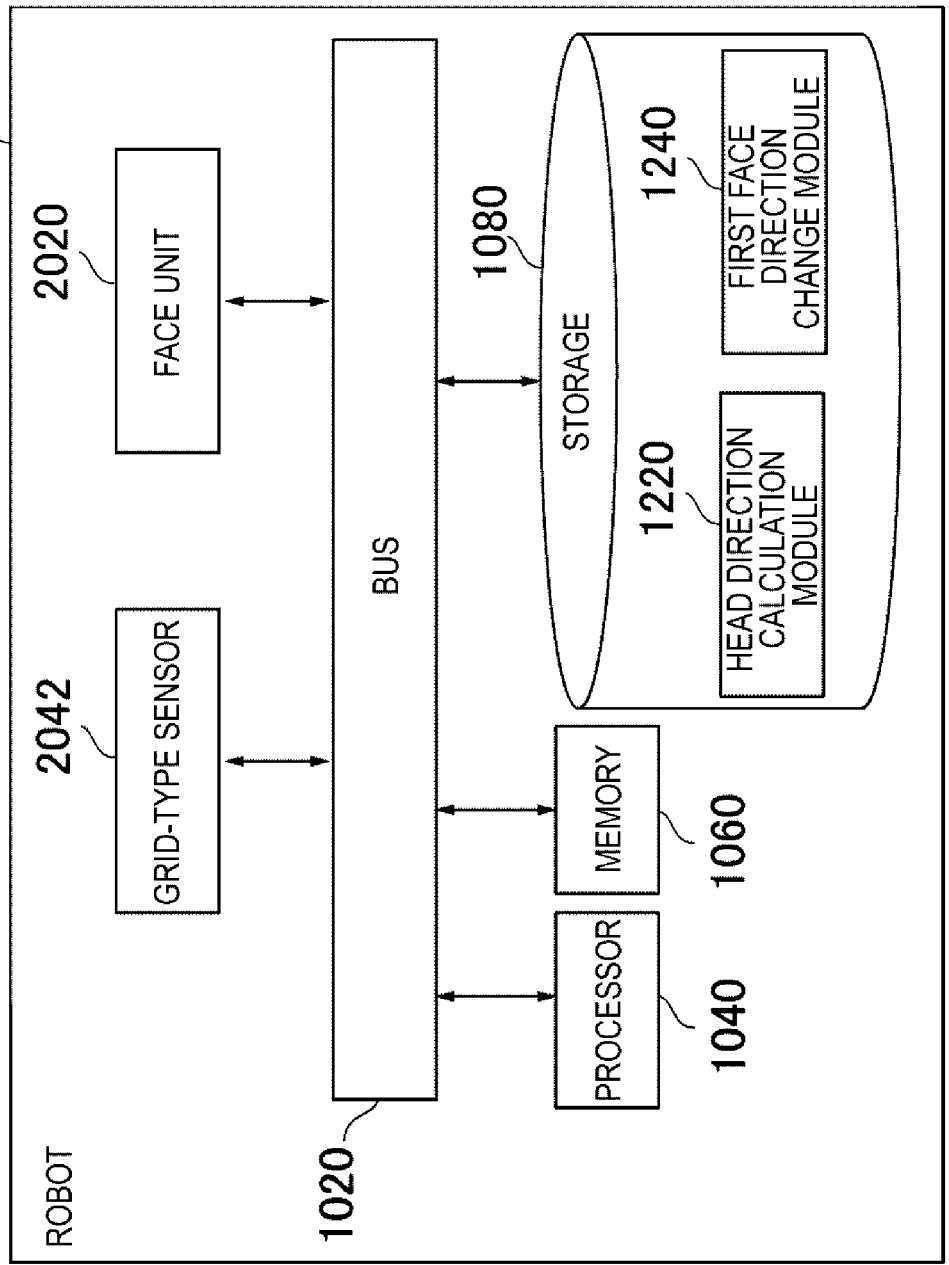
FIG. 2 is a block diagram illustrating a hardware configuration of the robot according to Exemplary embodiment 1.

FIG. 2 is a block diagram illustrating a hardware configuration of the robot 2000 according to Exemplary embodiment 1. In FIG. 2, the robot 2000 includes a bus 1020, a processor 1040, a memory 1060, a storage 1080, a grid-type sensor 2042, and the face unit 2020. The grid-type sensor 2042 is a grid-type sensor provided in the temperature distribution detection unit 2040.

The bus 1020 is a data transmission path via which the processor 1040, the memory 1060, the storage 1080, the grid-type sensor 2042, and the face unit 2020 transmit and receive data to and from each other. The processor 1040 is a processing device such as a central processing unit (CPU) or a graphics processing unit (GPU). The memory 1060 is a memory such as a random access memory (RAM) or a read only memory (ROM). The storage 1080 is a storage device such as a hard disk, a solid state drive (SSD), or a memory card. The storage 1080 may be a memory such as a RAM or a ROM.

A head direction calculation module 1220 is a program causing the robot 2000 to have a function of the head direction calculation unit 2060. The processor 1040 executes the head direction calculation module 1220 so as to realize the function of the head direction calculation unit 2060.

A first face direction changing module 1240 is a program causing the robot 2000 to have a function of the first face direction change unit 2080. The processor 1040 executes the first face direction changing module 1240 so as to realize the function of the first face direction change unit 2080.

For example, the processor 1040 reads each of the modules onto the memory 1060 and executes the modules. However, the processor 1040 may execute each module without reading a module onto the memory 1060.

The storage 1080 stores the respective modules.

For example, the grid-type sensor 2042 stores a detected temperature distribution on the memory 1060 or the storage 1080. The robot 2000 may include a storage portion storing the detected temperature distribution in the grid-type sensor 2042.

A hardware configuration of the robot 2000 is not limited to the configuration illustrated in FIG. 2. For example, each of the modules may be stored in the memory 1060. In this case, the robot 2000 does not have to include the storage 1080.

<Flow of Process>

Figure 3:
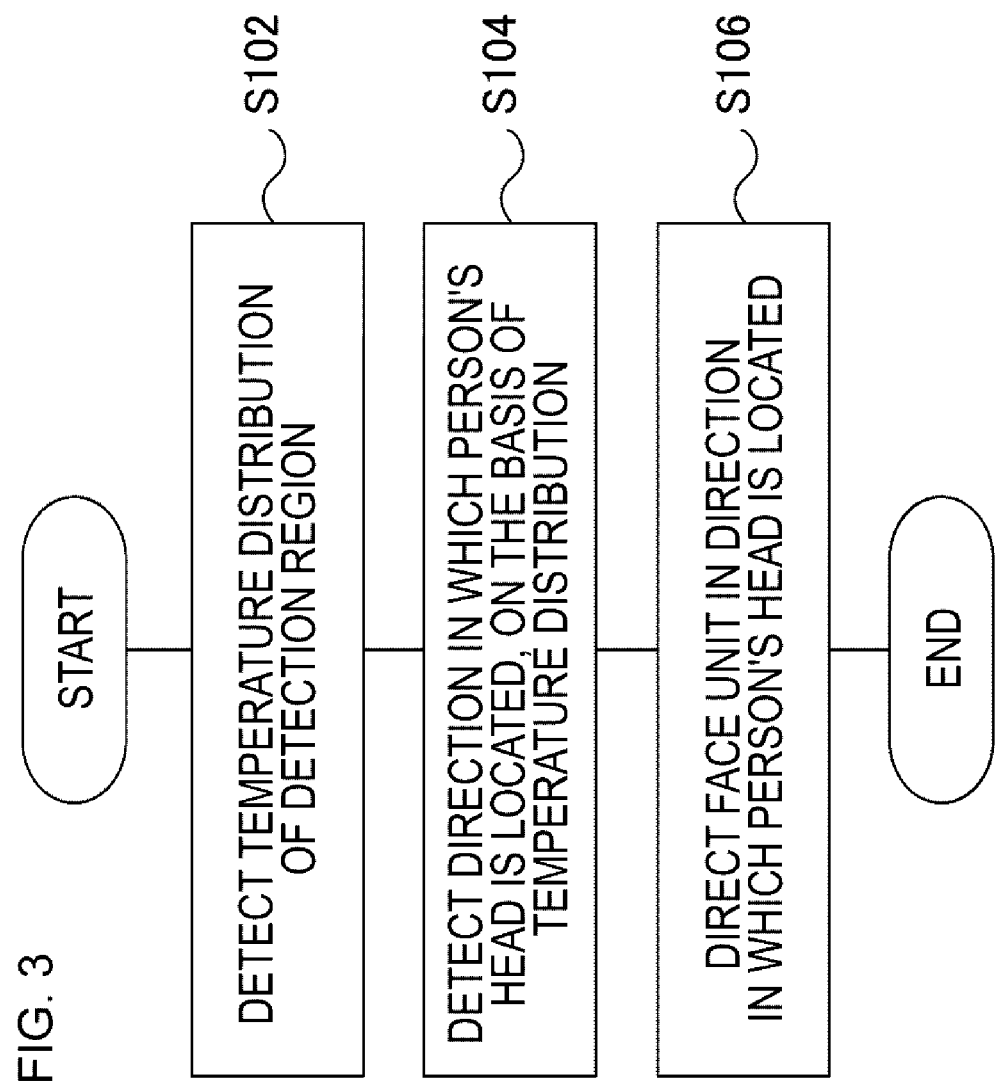
FIG. 3 is a flowchart illustrating a flow of a process performed by the robot according to Exemplary embodiment 1.

FIG. 3 is a flowchart illustrating a flow of a process performed by the robot 2000 according to Exemplary embodiment 1. In step S102, the temperature distribution detection unit 2040 detects a temperature distribution of a detection region. In step S104, the head direction calculation unit 2060 detects a direction in which a person's head is located on the basis of the temperature distribution. In step S106, the first face direction change unit 2080 directs the face unit 2020 in the direction in which the person's head is located.

Hereinafter, the present exemplary embodiment will be described in more detail.

<Details of Face Unit 2020>

The face unit 2020 is made by imitating, for example, a person's face or an animal's face. However, the face unit 2020 does not have to imitate a person's face or an animal's face. For example, the face unit 2020 includes a camera capturing the surroundings, a speaker outputting sound, a microphone receiving sound, and the like. The robot 2000 performs communication with a person by using these constituent elements. However, a method with which the robot 2000 performs communication with a person is not limited thereto.

<Details of Temperature Distribution Detection Unit 2040>

For example, the temperature distribution detection unit 2040 is a grid-type sensor provided with a plurality of photo-detectors, which detect a temperature by receiving infrared rays. For example, the grid-type sensor includes 64 infrared photo-detectors arranged in an 8×8 grid form.

FIG. 4 is a diagram illustrating a state in which a temperature distribution of a detection region 10 is detected by the temperature distribution detection unit 2040 including the 8×8 grid-type sensor 2042. Each square in a temperature distribution 30 illustrated in FIG. 4 indicates a temperature detected by a single photo-detector. Hereinafter, in a temperature distribution detected by the temperature distribution detection unit 2040, a portion (for example, each square in the temperature distribution illustrated in FIG. 4) indicating a temperature detected by a single photo-detector will be referred to as a cell.

In the temperature distribution 30, a cell 40 corresponding to a direction in which a person 20 is located indicates a temperature similar to a temperature of the person 20. Typically, the temperature of a space where nothing is placed, a wall, or a place where furniture or the like is placed is lower than the temperature of the person 20. In the temperature distribution 30, a temperature indicated by the cells 40 filled with diagonal lines is higher than a temperature indicated by the cells 40 filled with a dot pattern. Thus, it can be seen that the cells 40 filled with the diagonal lines are cells corresponding to the direction in which the person is located.

In the robot 2000, the temperature distribution detection unit 2040 may be provided at various positions. For example, the temperature distribution detection unit 2040 may be provided in a body of the robot 2000 or the face unit 2020.

Figure 5:
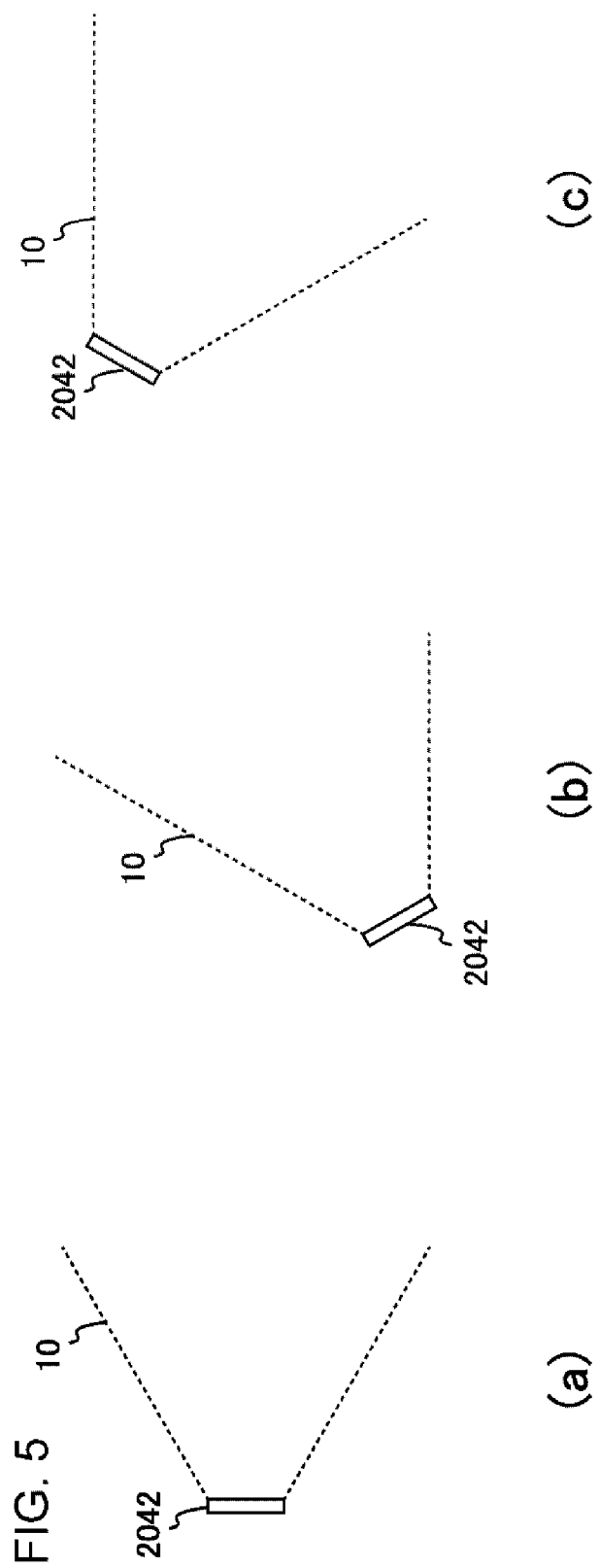
FIG. 5 shows diagrams illustrating states in which a detection region of the temperature distribution detection unit is viewed sideways in a horizontal direction.

Here, an angle of a detection result of the temperature distribution detection unit 2040 may be less than 180 degrees (for example, 60 degrees). FIG. 5 shows diagrams illustrating states in which the detection region of the temperature distribution detection unit 2040 is viewed sideways in a horizontal direction. In a case where the temperature distribution detection unit 2040 is installed at a position which may be lower than a person's head (for example, a height of 50 cm from the ground), the temperature distribution detection unit 2040 is preferably installed with being tilted upward from the horizontal direction as illustrated in FIG. 5(*b*). On the other hand, in a case where the temperature distribution detection unit 2040 is installed at a position which may be higher than a person's head (for example, a height of 2.5 m from the ground), the temperature distribution detection unit 2040 is preferably installed with being tilted downward from the horizontal direction as illustrated in FIG. 5(*c*). As mentioned above, the temperature distribution detection unit 2040 is installed with being appropriately tilted, and thus it is possible to increase a probability that a person's head may be included in the detection region 10.

The temperature distribution detection unit 2040 may repeatedly detect a temperature distribution of the same region, or may detect temperature distributions of different regions. For example, the robot 2000 detects temperature distributions of different regions by changing a direction of the temperature distribution detection unit 2040. For example, in a case where the temperature distribution detection unit 2040 is provided at the body of the robot 2000, the robot 2000 changes a direction of the temperature distribution detection unit 2040 by performing an operation, such as rotating the body thereof.

The number of temperature distribution detection units 2040 provided in the robot 2000 may be one or plural. If the number of temperature distribution detection units 2040 provided in the robot 2000 is reduced, costs for providing the temperature distribution detection units 2040 are reduced. On the other hand, if the number of temperature distribution detection units 2040 provided in the robot 2000 is increased, temperature distributions of a wide region can be detected even if a frequency of changing directions of the temperature distribution detection units 2040 is reduced. As a result, it is possible to delay deterioration of a driving portion used for an operation such as rotating the body.

There are various frequencies at which the temperature distribution detection unit 2040 may detect a temperature distribution. For example, the temperature distribution detection unit 2040 may detect a temperature distribution in a periodic manner (for example, once every 200 ms). The temperature distribution detection unit 2040 may irregularly detect a temperature distribution.

For example, the temperature distribution detection unit 2040 may use a single temperature distribution detected by the grid-type sensor 2042 as a single detection result in the temperature distribution detection unit 2040. In addition, for example, the temperature distribution detection unit 2040 may perform statistical processing on a plurality of different temperature distributions detected for the same region by the grid-type sensor 2042 so as to generate a single temperature distribution, and use the generated temperature distribution as a single detection result. For example, the grid-type sensor 2042 may calculate a statistical value of temperatures indicated by the same cell with respect to a plurality of different temperature distributions detected in the same region. In addition, the grid-type sensor 2042 may use a single temperature distribution in which temperatures of the respective cells show the statistical value calculated in the above-described way, as a single detection result. The statistical processing may be performed in the grid-type sensor 2042, and may be performed by a separate processing element included in the temperature distribution detection unit 2040.

<Details of Head Direction Calculation Unit 2060>

The head direction calculation unit 2060 detects a direction in which a person's head is located on the basis of the temperature distribution detected by the temperature distribution detection unit 2040. For example, the head direction calculation unit 2060 may determine cells whose temperatures are included in a predetermined range (for example, 30 degrees or higher and 35 degrees or lower) in the detected temperature distribution, as candidates for cells representing a person. The head direction calculation unit 2060 may determine cells corresponding to the highest position in a direction vertical to the ground, among the candidates of the cells representing the person, as cells corresponding to a direction in which the person's head is located. In addition, for example, the head direction calculation unit 2060 may calculate a central position in the determined cells, and determine a direction corresponding to the central position as a direction in which the person's head is located. By setting a predetermined range to a temperature close to the temperature of a person, the head direction calculation unit 2060 can determine a cell indicating a temperature close to the temperature of the person on the basis of the temperature distribution.

In addition, the head direction calculation unit 2060 may determine a cell as the candidate of the cell representing a person among the cells included in the temperature distribution only in a case where a temperature of the cell is within the predetermined range, and one or more temperatures of respective cells adjacent to the cell are included in the predetermined range. In other words, in a case where none of temperatures of respective cells adjacent to a certain cell is included in the predetermined range, the cell is handled as not representing a person. This is because a person is considered to have a size corresponding to a plurality of cells.

For example, the head direction calculation unit 2060 may use the position in the temperature distribution to calculate a direction corresponding to the position on the basis of an angle range in the horizontal direction and an angle range in the vertical direction of the temperature distribution detection unit 2040. In addition, for example, the head direction calculation unit 2060 may acquire information indicating a direction corresponding to each cell from the inside or the outside of the head direction calculation unit 2060.

The head direction calculation unit 2060 operates, for example, when the temperature distribution detection unit 2040 detects a temperature distribution. In addition, for example, in a case where a person's head is detected in a certain temperature distribution, the head direction calculation unit 2060 does not have to detect the person's head for a predetermined period of time thereafter. This is because, if the head direction calculation unit 2060 detects a person's head, communication is started between the person and the robot 2000 through a subsequent operation of the robot 2000, and thus it is considered that there is a low probability that the person may move from the detected position. As mentioned above, it is possible to reduce energy consumption of the robot 2000 by reducing a frequency of detecting a direction in which a person's head is located in the head direction calculation unit 2060.

In addition, in a case where a person's head is detected in a certain temperature distribution, the head direction calculation unit 2060 may also detect a position of the person's head in a subsequent temperature distribution and determine whether or not the position of the person's head has changed. Then, the head direction calculation unit 2060 calculates a direction in which the person's head is located only in a case where the position of the person's head has changed. In the above-described way, the first face direction change unit 2080 operates only in a case where the position of the person's head is being moved. Also in the above-described way, it is possible to reduce energy consumption of the robot 2000.

<Details of First Face Direction Change Unit 2080>

A method of directing a direction of the face unit 2020 in a designated direction is a well-known technique, and thus detailed description thereof is not described.

[Exemplary Embodiment 2]

Figure 6:
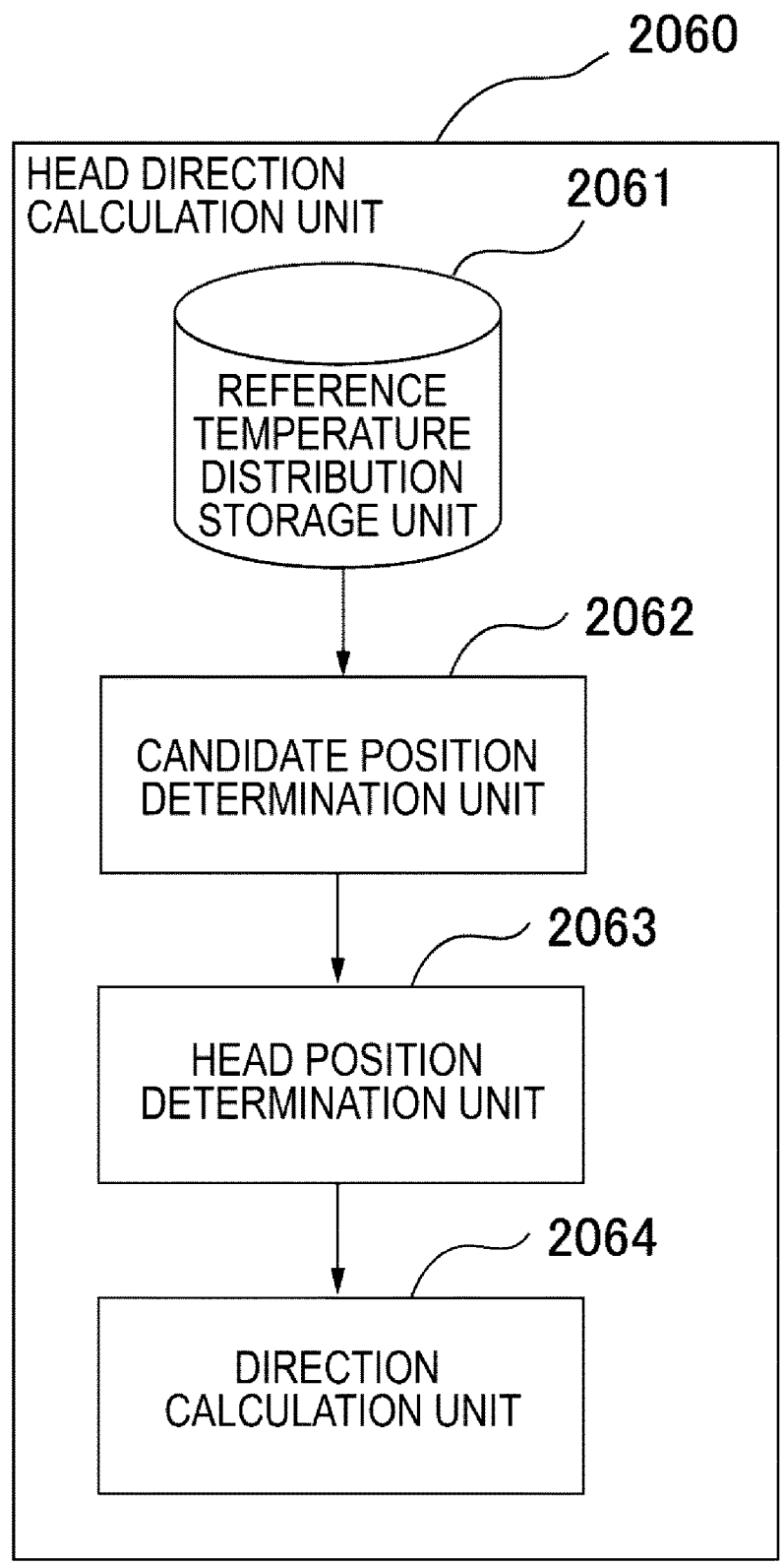
FIG. 6 is a block diagram illustrating a head direction calculation unit of a robot according to Exemplary embodiment 2.

FIG. 6 is a block diagram illustrating a head direction calculation unit 2060 of a robot 2000 according to Exemplary embodiment 2. The robot 2000 according to the Exemplary embodiment 2 is the same as the robot 2000 according to the Exemplary embodiment 1 except that the head direction calculation unit 2060 includes respective functional constituent units illustrated in FIG. 6. In FIG. 6, an arrow indicates a flow of information. In addition, in FIG. 6, each block indicates not a configuration in the hardware unit but a configuration in the function unit.

The head direction calculation unit 2060 according to Exemplary embodiment 2 includes a reference temperature distribution storage unit 2061, a candidate position determination unit 2062, a head position determination unit 2063, and a direction calculation unit 2064.

<Reference Temperature Distribution Storage Unit 2061>

The reference temperature distribution storage unit 2061 stores a reference temperature distribution. For example, the robot 2000 includes an input element for setting a reference temperature distribution in the reference temperature distribution storage unit 2061. In this case, a user, a manager, or the like of the robot 2000 sets a reference temperature distribution in the reference temperature distribution storage unit 2061. For example, in this case, a temperature indicated by each cell in the reference temperature distribution is set to the ambient temperature of the room in which the robot 2000 is provided.

In addition, for example, the robot 2000 detects a temperature distribution in advance by using the temperature distribution detection unit 2040 without being a person in a region, the temperature distribution of which will possibly be detected by the temperature distribution detection unit 2040. Then, the robot 2000 uses the detected temperature distribution as a reference temperature distribution to be stored in the reference temperature distribution storage unit 2061. However, a temperature distribution detected in a situation in which a person is present may be used as the reference temperature distribution.

<Candidate Position Determination Unit 2062>

The candidate position determination unit 2062 acquires the reference temperature distribution from the reference temperature distribution storage unit 2061. In addition, the candidate position determination unit 2062 determines a cell in a temperature distribution, where the absolute value of the difference between the temperature indicated by the cell and the reference temperature distribution is equal to or greater than a predetermined value. Hereinafter, such a cell will be referred to as a candidate cell. The predetermined value is, for example, 2 degrees.

<Head Position Determination Unit 2063>

The head position determination unit 2063 determines cells corresponding to a direction in which a person's head is located among the candidate cells. For example, the head position determination unit 2063 determines candidate cells corresponding to the highest position among the candidate cells, as cells corresponding to the direction in which the person's head is located. In addition, for example, the head direction calculation unit 2060 calculates a central position of the candidate cells, and determines cells at the central position as cells corresponding to the direction in which the person's head is located.

<Direction Calculation Unit 2064>

The direction calculation unit 2064 calculates the direction in which the person's head is located on the basis of the cells determined by the head position determination unit 2063.

<Flow of Process>

Figure 7:
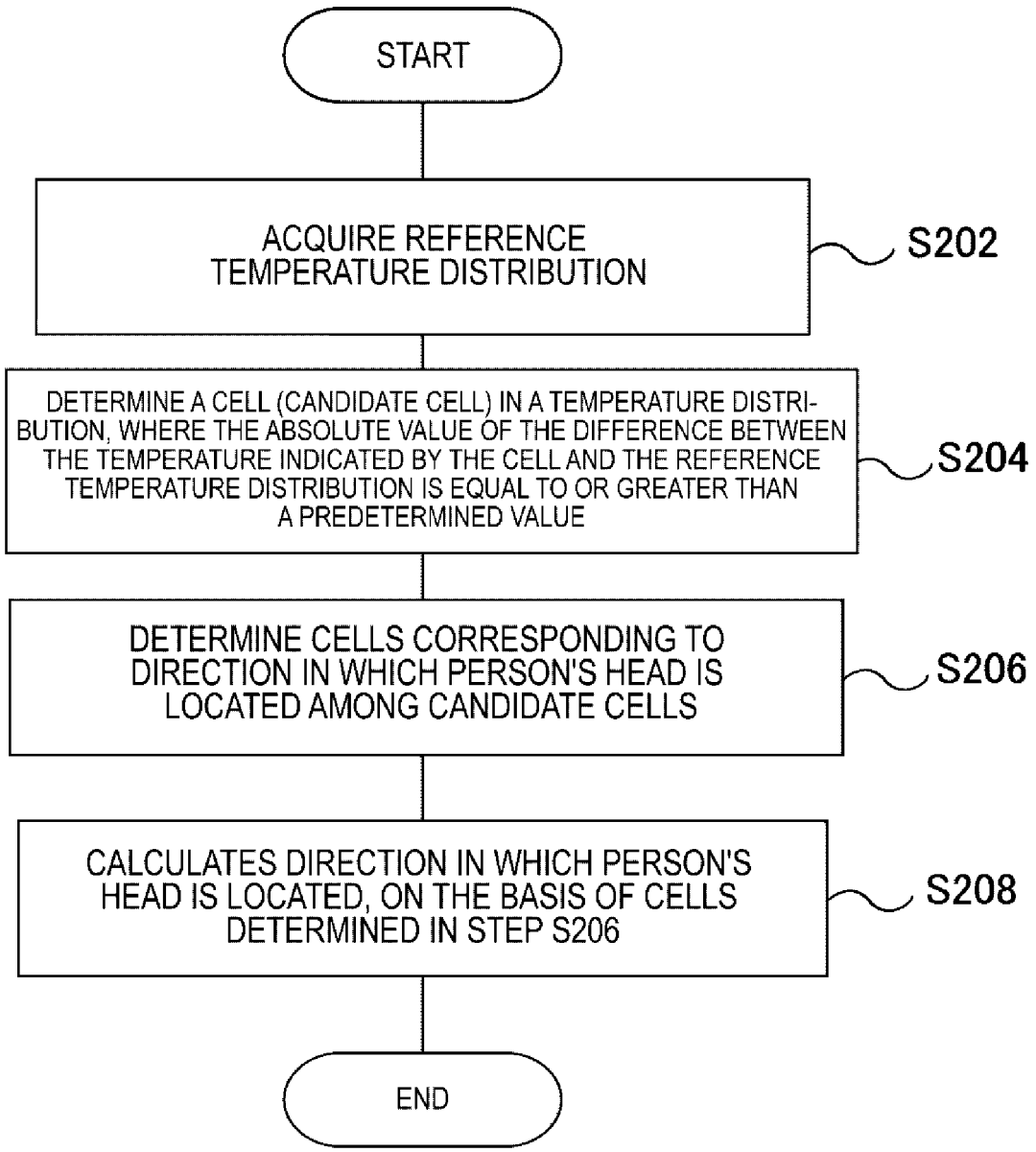
FIG. 7 is a flowchart illustrating a flow of a process performed by the head direction calculation unit according to Exemplary embodiment 2.

FIG. 7 is a flowchart illustrating a flow of a process performed by the head direction calculation unit 2060 according to Exemplary embodiment 2. In other words, FIG. 7 illustrates an example of the flow of the process performed by the head direction calculation unit 2060 in step S104 of FIG. 3.

In step S202, the candidate position determination unit 2062 acquires the reference temperature distribution from the reference temperature distribution storage unit 2061. In step S204, the candidate position determination unit 2062 determines a cell in a temperature distribution, where the absolute value of the difference between the temperature indicated by the cell and the reference temperature distribution is equal to or greater than a predetermined value. In step S206, the head position determination unit 2063 determines cells corresponding to a direction in which a person's head is located among the candidate cells. In step S208, the direction calculation unit 2064 calculates the direction in which the person's head is located on the basis of the cells determined by the head position determination unit 2063.

<Advantageous Effects>

According to the robot 2000 of the present exemplary embodiment, cell candidates corresponding to a direction in which a person's head is located are determined on the basis of a difference between a temperature indicated by each cell in the reference temperature distribution stored in the reference temperature distribution storage unit 2061 and a temperature indicated by each cell in a temperature distribution. Here, an approximate value of a temperature detected in a direction in which there is no person can be predicted to be close to the ambient temperature of a room in which the robot 2000 operates, or close to a temperature distribution detected by operating the temperature distribution detection unit 2040 in the direction in which there is no person in advance. According to the robot 2000 of the present exemplary embodiment, since the temperature distribution based on such prediction can be used as the reference temperature distribution, the reference temperature distribution can be accurately set. Therefore, it is possible to accurately calculate a direction in which a person's head is located. As a result, it is possible to accurately direct a direction of the face unit 2020 in the direction in which the person's head is located. Therefore, the person and the robot 2000 can perform more natural communication.

[Exemplary Embodiment 3]

Figure 8:
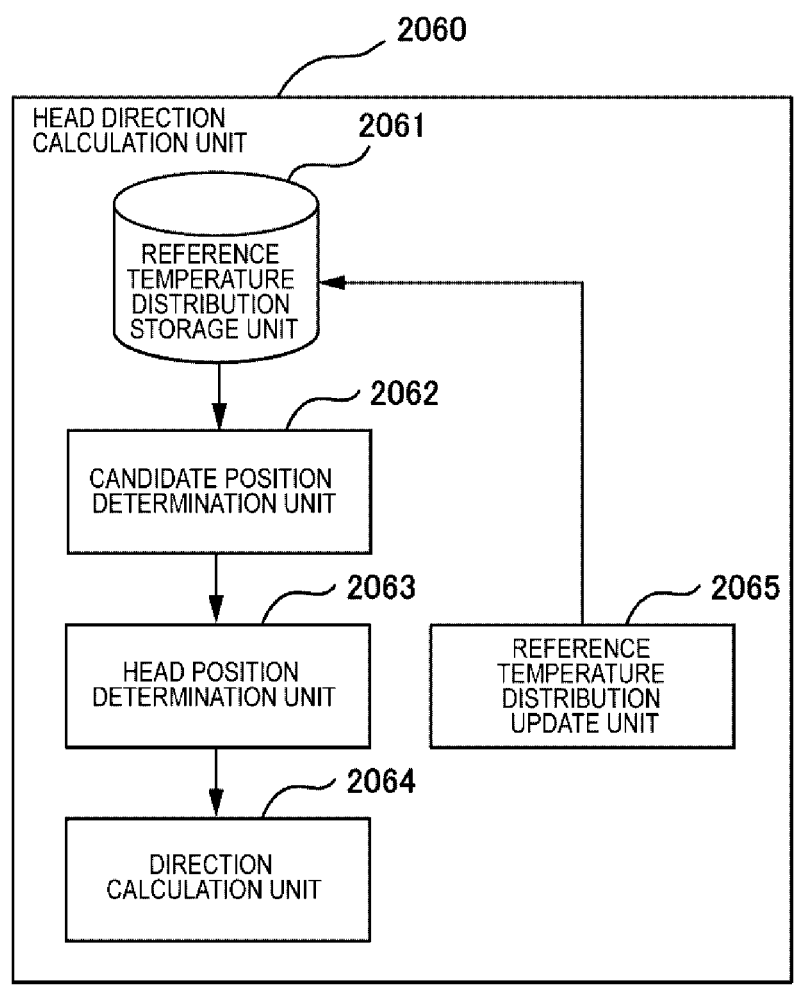
FIG. 8 is a block diagram illustrating a head direction calculation unit of a robot according to Exemplary embodiment 3.

FIG. 8 is a block diagram illustrating a head direction calculation unit 2060 of a robot 2000 according to Exemplary embodiment 3. The robot 2000 according to the Exemplary embodiment 3 is the same as the robot 2000 according to the Exemplary embodiment 2 except that the head direction calculation unit 2060 includes respective functional constituent units illustrated in FIG. 8. In FIG. 8, an arrow indicates a flow of information. In addition, in FIG. 8, each block indicates not a configuration in the hardware unit but a configuration in the function unit.

The head direction calculation unit 2060 of Exemplary embodiment 3 has a function of updating the reference temperature distribution stored in the reference temperature distribution storage unit 2061. For this, the head direction calculation unit 2060 of Exemplary embodiment 3 includes a reference temperature distribution update unit 2065. Here, the temperature distribution detection unit 2040 of Exemplary embodiment 3 repeatedly detects temperature distributions of the same detection region. In other words, a plurality of temperature distributions at different time points are detected for the same detection region.

<Reference Temperature Distribution Update Unit 2065>

The reference temperature distribution update unit 2065 updates the reference temperature distribution stored in the reference temperature distribution storage unit 2061 on the basis of a temperature distribution detected by the temperature distribution detection unit 2040.

For example, the reference temperature distribution update unit 2065 calculates a statistical value of temperatures for the same cell by using the temperature distribution detected by the temperature distribution detection unit 2040 and the reference temperature distribution storage unit 2061. Then, a temperature distribution having the statistical values as temperatures of the respective cells is handled as an updated reference temperature distribution.

For example, the reference temperature distribution update unit 2065 calculates a new reference temperature distribution according to Equation (1). Equation (1) is an equation with which a temperature of each cell in a new reference temperature distribution is calculated as a weighted mean value of a temperature of each cell in a temperature distribution detected by the temperature distribution detection unit 2040 and a temperature of each cell in the reference temperature distribution stored in the reference temperature distribution storage unit 2061. In Equation (1), B'(i, j) indicates the temperature of the cell of the i-th row and the j-th column in the new reference temperature distribution. In addition, B(i, j) indicates the temperature of the cell of the i-th row and the j-th column in the reference temperature distribution stored in the reference temperature distribution storage unit 2061, that is, in a reference temperature distribution before being updated. Further, E(i, j) indicates the temperature of the cell of the i-th row and the j-th column in a temperature distribution detected by the temperature distribution detection unit 2040. Still further, α and β are weighting factors, which are respectively given to the reference temperature distribution before being updated and the temperature distribution detected by the temperature distribution detection unit 2040. For example, α is 0.99, and β is 0.01.

[Equation 1]

$$B'(i,j) = \alpha \cdot B(i,j) + \beta \cdot E(i,j) \quad (1)$$

Here, α+β=1

<Candidate Position Determination Unit 2062>

The candidate position determination unit 2062 of Exemplary embodiment 3 determines candidate cells, for example, in the latest temperature distribution. In this case, the head direction calculation unit 2060 of Exemplary embodiment 3 calculates a direction in which a person's head is located on the basis of the latest temperature distribution. For example, the candidate position determination unit 2062 starts a process when the temperature distribution detection unit 2040 detects a new temperature distribution. In addition, the candidate position determination unit 2062 may periodically start a process and may use the latest temperature distribution at the time of starting the process.

However, a temperature distribution used by the candidate position determination unit 2062 does not have to be the latest temperature distribution.

<Flow of Process>

Figure 9:
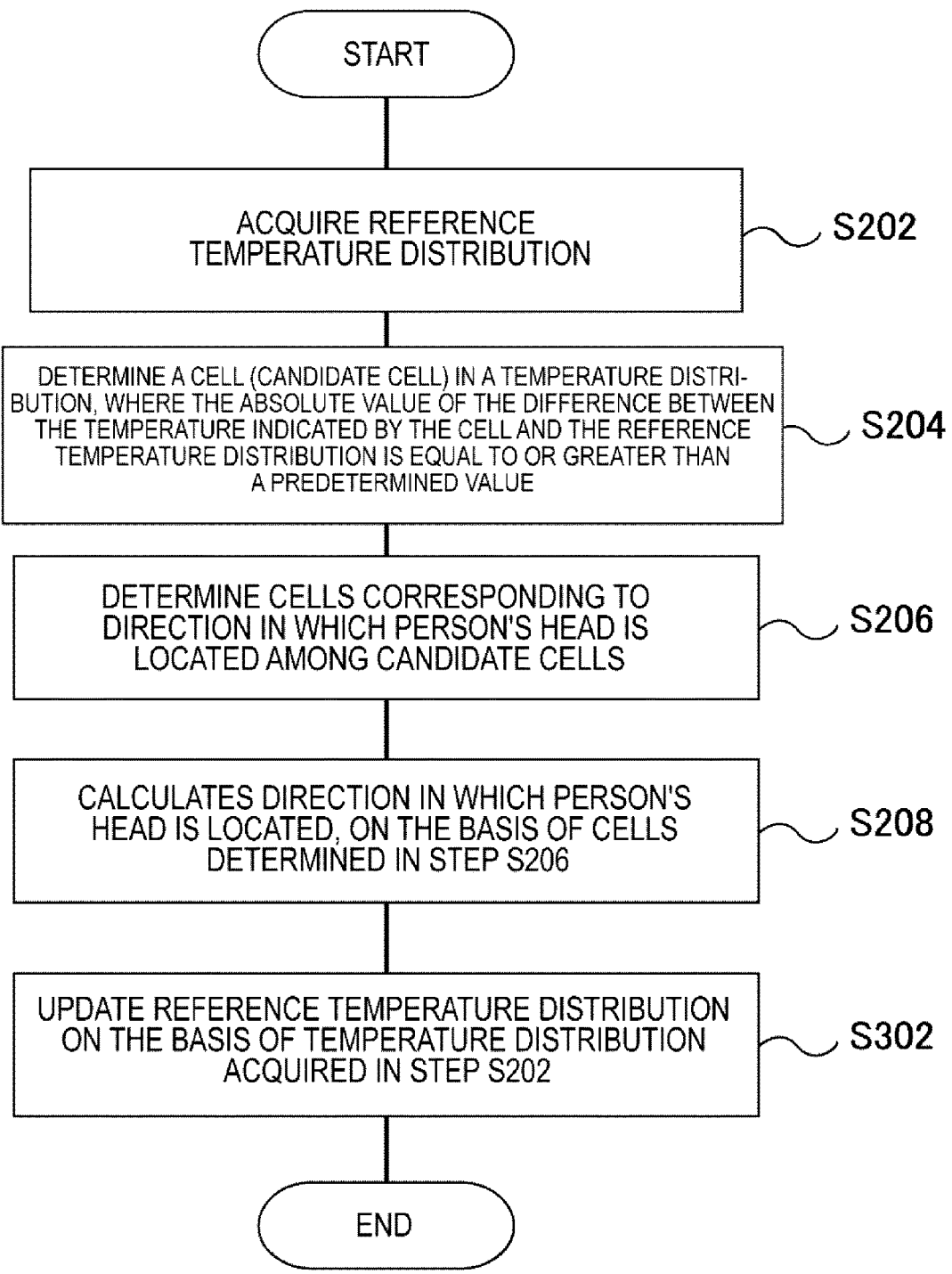
FIG. 9 is a flowchart illustrating a flow of a process performed by the head direction calculation unit according to Exemplary embodiment 3.

FIG. 9 is a flowchart illustrating a flow of a process performed by the head direction calculation unit 2060 according to Exemplary embodiment 3. In the same manner as in FIG. 7, FIG. 9 illustrates an example of the flow of the process performed by the head direction calculation unit 2060 in step S104 of FIG. 3. In addition, processes in steps S202 to S208 of FIG. 9 are the same as those in steps S202 to S208 of FIG. 7. Thus, description of the steps will not be repeated. In step S302, the reference temperature distribution update unit 2065 calculates a new reference temperature distribution on the basis of a temperature distribution detected by the temperature distribution detection unit 2040. Further, the reference temperature distribution update unit 2065 updates the reference temperature distribution stored in the reference temperature distribution storage unit 2061 to the calculated new reference temperature distribution.

<Advantageous Effects>

The robot 2000 of the present exemplary embodiment includes the reference temperature distribution update unit 2065, which updates a reference temperature distribution. Here, a temperature distribution detected by the temperature distribution detection unit 2040 changes depending on an environmental change such as a temperature change or an influence of sunlight. For example, it is considered that a temperature indicated by each cell in a temperature distribution detected at daytime is higher than a temperature in the morning or at night. It is therefore considered that a temperature detected by the temperature distribution detection unit 2040 changes depending on an environmental change.

According to the robot 2000 of the present exemplary embodiment, a reference temperature distribution can be caused to track an environmental change since the reference temperature distribution update unit 2065 updates the reference temperature distribution. By doing so, according to the robot 2000 of the present exemplary embodiment, it is possible to more accurately determine cells corresponding to a direction in which a person's head is located. As a result, it is possible to more accurately direct a direction of the face unit 2020 in the direction in which the person's head is located. Therefore, the person and the robot 2000 can perform more natural communication.

[Exemplary Embodiment 4]

Figure 10:
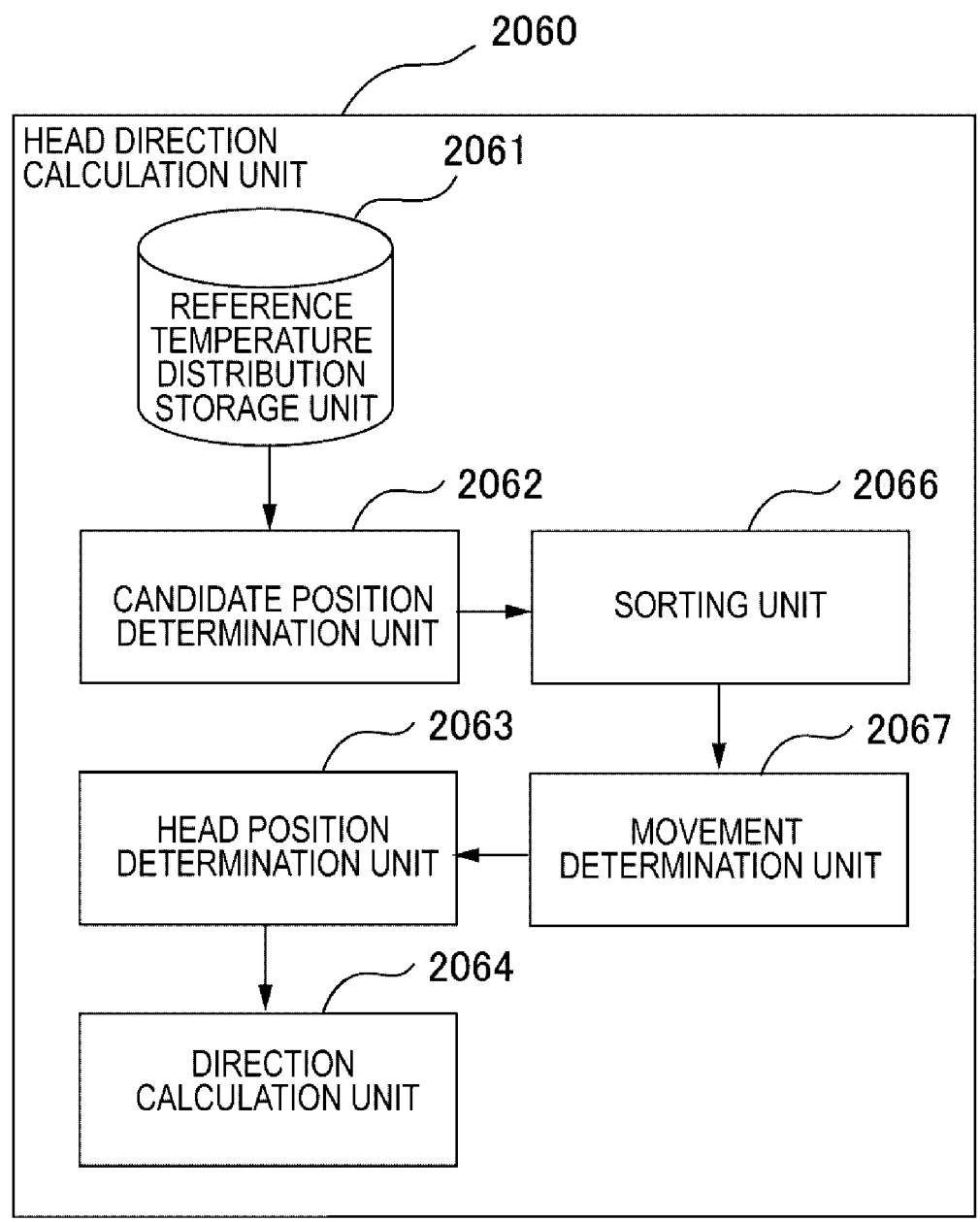
FIG. 10 is a block diagram illustrating a head direction calculation unit of a robot according to Exemplary embodiment 4.

FIG. 10 is a block diagram illustrating a head direction calculation unit 2060 of a robot 2000 according to Exemplary embodiment 4. The robot 2000 according to the Exemplary embodiment 4 is the same as the robot 2000 according to the Exemplary embodiment 2 or 3 except that the head direction calculation unit 2060 includes respective functional constituent units illustrated in FIG. 10. In FIG. 10, an arrow indicates a flow of information. In addition, in FIG. 10, each block indicates not a configuration in the hardware unit but a configuration in the function unit.

The head direction calculation unit 2060 of Exemplary embodiment 4 creates groups of candidate cells and determines whether or not each group is being moved. In addition, the head direction calculation unit 2060 determines candidate cells from a moving group. For this, the head direction calculation unit 2060 of Exemplary embodiment 4 includes a sorting unit 2066 and a movement determination unit 2067. Here, the temperature distribution detection unit 2040 of Exemplary embodiment 4 repeatedly detects temperature distributions of the same detection region in the same manner as the temperature distribution detection unit 2040 of Exemplary embodiment 3.

<Sorting Unit 2066>

The sorting unit 2066 divides the candidate cells into groups, which candidate cells are determined in the same temperature distribution by the candidate position determination unit 2062. For example, the sorting unit 2066 divides the candidate cells into groups so that candidate cells adjacent to each other in any one of a horizontal direction, a vertical direction, and a diagonal direction are included in the same group.

<Movement Determination Unit 2067>

The movement determination unit 2067 determines whether or not a group is moving by comparing the same groups with each other in a plurality of temperature distributions, for the respective groups divided by the sorting unit 2066. For example, the movement determination unit 2067 calculates a central position for each group in each temperature distribution. For example, a central position of the group is a central position of candidate cells included in the group. In addition, the movement determination unit 2067 compares central positions of the same groups in the plurality of temperature distributions with each other. Further, the movement determination unit 2067 determines that a "group is moving" if a change in the central position is equal to or more than a predetermined distance, and determines that a "group is not moving" if a change in the central position is less than the predetermined distance.

The movement determination unit 2067 is required to determine the same groups from groups included in different temperature distributions. The movement determination unit 2067 compares a group included in a temperature distribution detected at a certain time point by the temperature distribution detection unit 2040 (hereinafter, referred to as a temperature distribution A) with a group included in a temperature distribution detected at the next time point by the temperature distribution detection unit 2040 (hereinafter, referred to as a temperature distribution B) so as to determine the same group from the two temperature distributions. For example, the movement determination unit 2067 performs the following process. First, the movement determination unit 2067 calculates a central position of a group for each group. In addition, the movement determination unit 2067 compares a central position of a group X included in the temperature distribution A with a central position of each group included in the temperature distribution B. Here, it is assumed that a distance between the central position of the group X and a central position of a group Y included in the temperature distribution B is equal to or smaller than a predetermined distance. In this case, the movement determination unit 2067 determines that the group X and the group Y are the same group.

<Head Position Determination Unit 2063>

The head position determination unit 2063 determines cells corresponding to a direction in which a person's head is located from cells included in a group determined as moving among cells included in a temperature distribution. For example, the head position determination unit 2063 determines cells corresponding to the highest position from the ground among the cells included in the group determined as moving, as cells corresponding to the direction in which the person's head is located. In addition, for example, the head position determination unit 2063 calculates a central position of the cells included in the group determined as moving, and determines cells at the central position as cells corresponding to the direction in which the person's head is located. Here, for example, the head position determination unit 2063 determines cells corresponding to the direction in which the person's head is located from cells included in the latest temperature distribution among temperature distributions detected by the temperature distribution detection unit 2040.

With reference to FIG. 11, a process performed by the movement determination unit 2067 will be described in detail. FIG. 11 shows diagrams illustrating groups formed by candidate cells included in temperature distributions. In FIG. 11, the candidate cells are distributed in diagonal lines.

A temperature distribution 30 illustrated in FIG. 11(b) is the latest temperature distribution. A temperature distribution 30 illustrated in FIG. 11(a) is a temperature distribution detected by the temperature distribution detection unit 2040 one stage before the temperature distribution 30 illustrated in FIG. 11(b). In addition, the two temperature distributions are temperature distributions in the same detection region. Here, for each group, the movement determination unit 2067 determines that the group is moving in a case where a distance between a central position in FIG. 11(a) and a central position in FIG. 11(b) is equal to or more than 1.

In FIG. 11(a), the coordinate of the central position of the group 60-1 is (5.3, 3.8). In addition, in FIG. 11(b), the coordinate of the central position of the group 60-1 is (4.1, 4.0). Therefore, a movement distance of the central position of the group 60-1 is 1.48 and is thus equal to or more than 1. The movement determination unit 2067 thus determines that the "group 60-1 is moving".

On the other hand, the coordinate of the central position of the group 60-2 is (7.0, 7.5) in both of FIGS. 11(a) and 11(b). Therefore, a movement distance of the central position of the group 60-2 is 0. The movement determination unit 2067 therefore determines that the "group 60-2 is moving"

As mentioned above, in a case of FIG. 11, the head position determination unit 2063 determines cells corresponding to a direction in which a person's head is located from candidate cells included in the group 60-1.

<Flow of Process>

Figure 12:
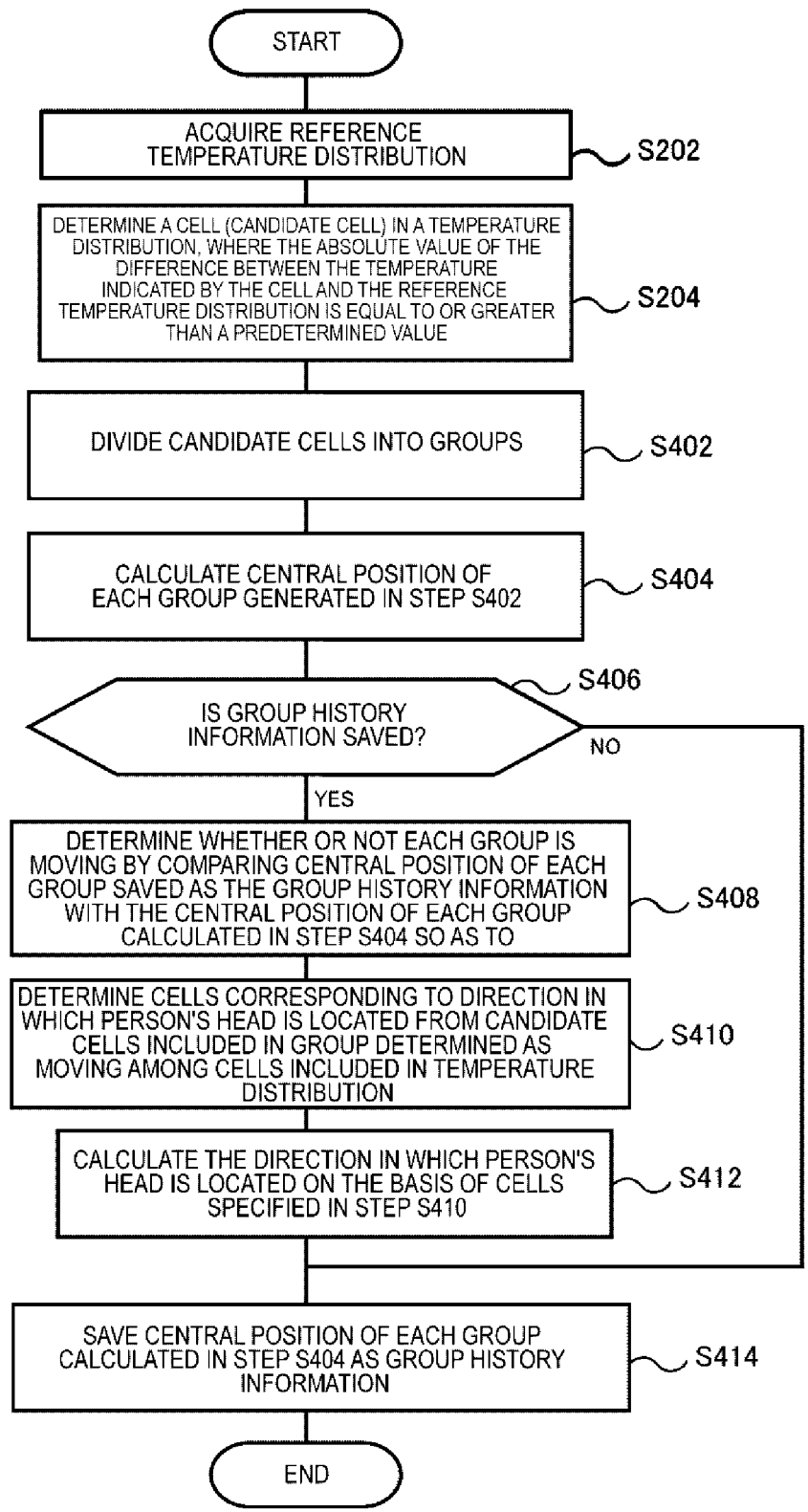
FIG. 12 is a flowchart illustrating a flow of a process performed by the head direction calculation unit according to Exemplary embodiment 4.

FIG. 12 is a flowchart illustrating a flow of a process performed by the head direction calculation unit 2060 of Exemplary embodiment 4. In FIG. 12, the movement determination unit 2067 calculates a central position of each group divided by the sorting unit 2066 and saves the central position as group history information. In addition, processes insteps S202 and S204 of FIG. 12 are the same as those in steps S202 and S204 of FIG. 7. Thus, description of steps S202 and S204 will not be repeated.

In step S402, the sorting unit 2066 divides candidate cells into groups. In step S404, the movement determination unit 2067 calculates a central position of each group generated in step S402. In step S406, the movement determination unit 2067 determines whether or not group history information is saved. In a case where the group history information is not saved, the process in FIG. 12 proceeds to step S414. Here, the case where the group history information is not saved is a case where, for example, the head direction calculation unit 2060 performs the process illustrated in FIG. 12 for the first time. On the other hand, in a case where the group history information is saved, the process in FIG. 12 proceeds to step S408.

In step S408, the movement determination unit 2067 compares a central position of each group saved as the group history information (past central position) with the central position of each group calculated in step S404 (present central position). In addition, the movement determination unit 2067 determines whether or not each group is moving.

In step S410, the head position determination unit 2063 determines cells corresponding to a direction in which a person's head is located from cells included in a group determined as moving among cells included in a temperature distribution. In step S412, the direction calculation unit 2064 calculates the direction in which the person's head is located on the basis of the cells determined in step S410.

In step S414, the movement determination unit 2067 saves the central position of each group calculated in step S404 as group history information.

<Advantageous Effects>

In a case where an object having a temperature similar to a temperature of a person's head is included in a detection region of the temperature distribution detection unit 2040, it is difficult for the head direction calculation unit 2060 to differentiate a person from the object having the temperature similar to a temperature of the person, only with the temperature that each of cells in temperature distribution indicates. The object having the temperature similar to a temperature of a person is a home electrical appliance such as a luminaire or a heater, for example.

The robot 2000 of the present exemplary embodiment determines whether or not each group formed by candidate cells is moving, and determines cells corresponding to a direction in which a person's head is located from candidate cells included in a moving group. Here, even in a case where a person stops or sits, the person performs an action such as changing a posture thereof, and thus a central position thereof is frequently changed. Thus, according to the robot 2000 of the present exemplary embodiment, it is possible to differentiate a person from an object having a temperature similar to a temperature of the person. Thus, according to the robot 2000 of the present exemplary embodiment, it is possible to direct the face unit 2020 in a direction in which a person's head is located with higher probability.

[Exemplary Embodiment 5]

Figure 13:
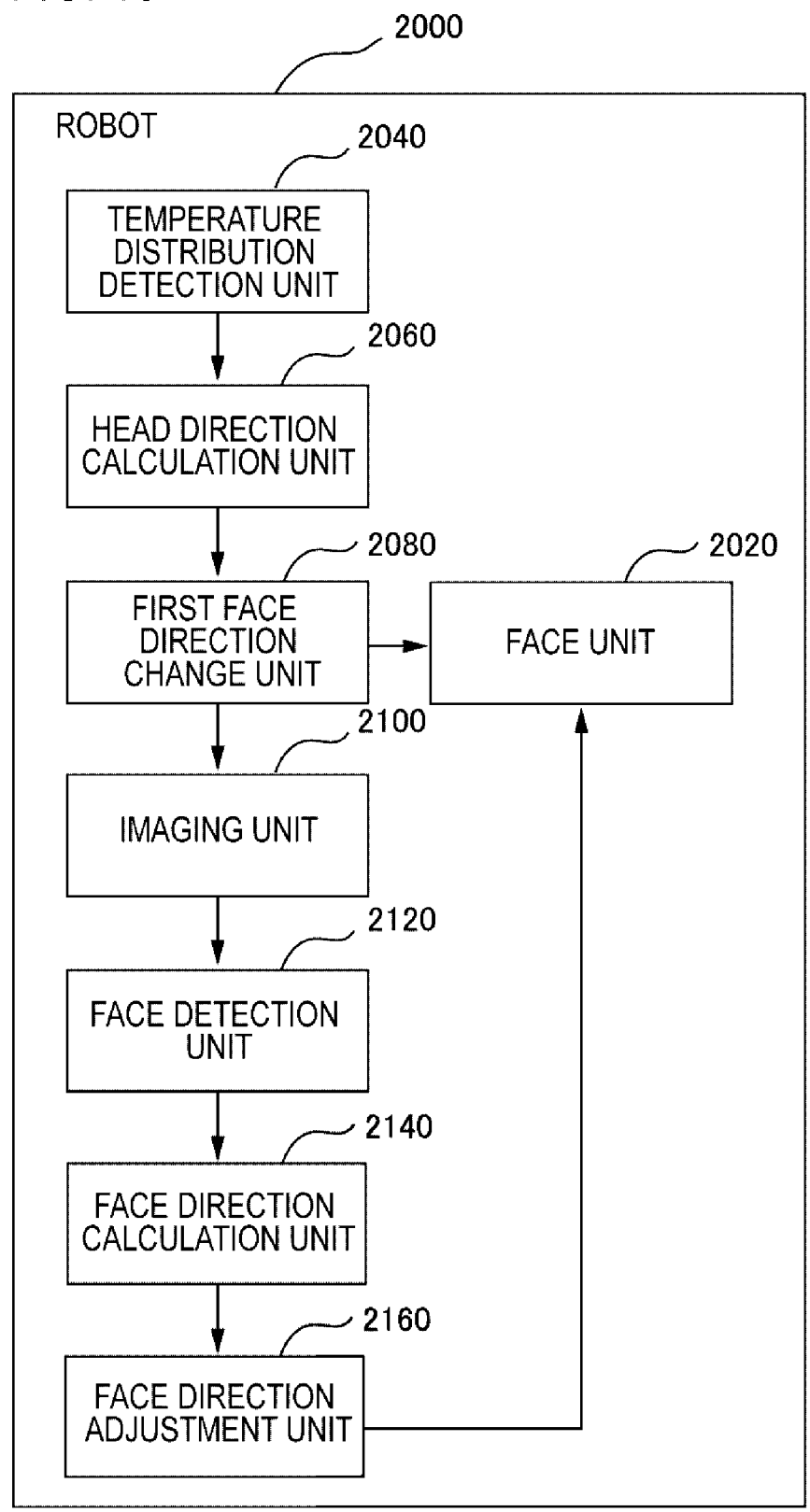
FIG. 13 is a block diagram illustrating a robot according to Exemplary embodiment 5.

FIG. 13 is a block diagram illustrating a robot 2000 according to Exemplary embodiment 5. In FIG. 13, an arrow indicates a flow of information. In addition, in FIG. 13, each block indicates not a configuration in the hardware unit but a configuration in the function unit.

The robot 2000 of Exemplary embodiment 5 has a function of changing a direction of the face unit 2020 in a direction in which a person's head is located and then adjusting the direction of the face unit 2020 to a direction of a person's face. For this, the robot 2000 includes an imaging unit 2100, a face detection unit 2120, a face direction calculation unit 2140, and a face direction adjustment unit 2160.

<Imaging Unit 2100>

In a case where a direction of the face unit 2020 is changed by the first face direction change unit 2080, the imaging unit 2100 performs capturing with an angle of view thereof including a direction in which the face unit 2020 is directed, and thus generates an image.

The imaging unit 2100 includes a camera or the like for performing capturing. The imaging unit 2100 may be provided at various positions. Suppose that the face unit 2020 has an eyeball element. In this case, the imaging unit 2100 is provided at, for example, the eyeball element. In addition, the imaging unit 2100 may be provided at other portions on the face unit 2020, and may be provided at portions other than the face unit 2020 (for example, the body of the robot).

<Face Detection Unit 2120>

The face detection unit 2120 detects a person's face from the image generated by the imaging unit 2100. A method of detecting a person's face from an image is well-known technique, and a detailed description of the method is not described.

<Face Direction Calculation Unit 2140>

The face direction calculation unit 2140 calculates a direction in which a person's face is located on the basis of a detection result from the face detection unit 2120. Specifically, the face direction calculation unit 2140 calculates the direction in which the person's face is located on the basis of a direction in which the imaging unit 2100 performs capturing, an angle of view of the imaging unit 2100, and a position of the face in the captured image.

<Face Direction Adjustment Unit 2160>

The face direction adjustment unit 2160 adjusts a direction of the face unit 2020 so that the face unit 2020 is directed in the direction in which the person's face is located, calculated by the face direction calculation unit 2140.

<Flow of Process>

Figure 14:
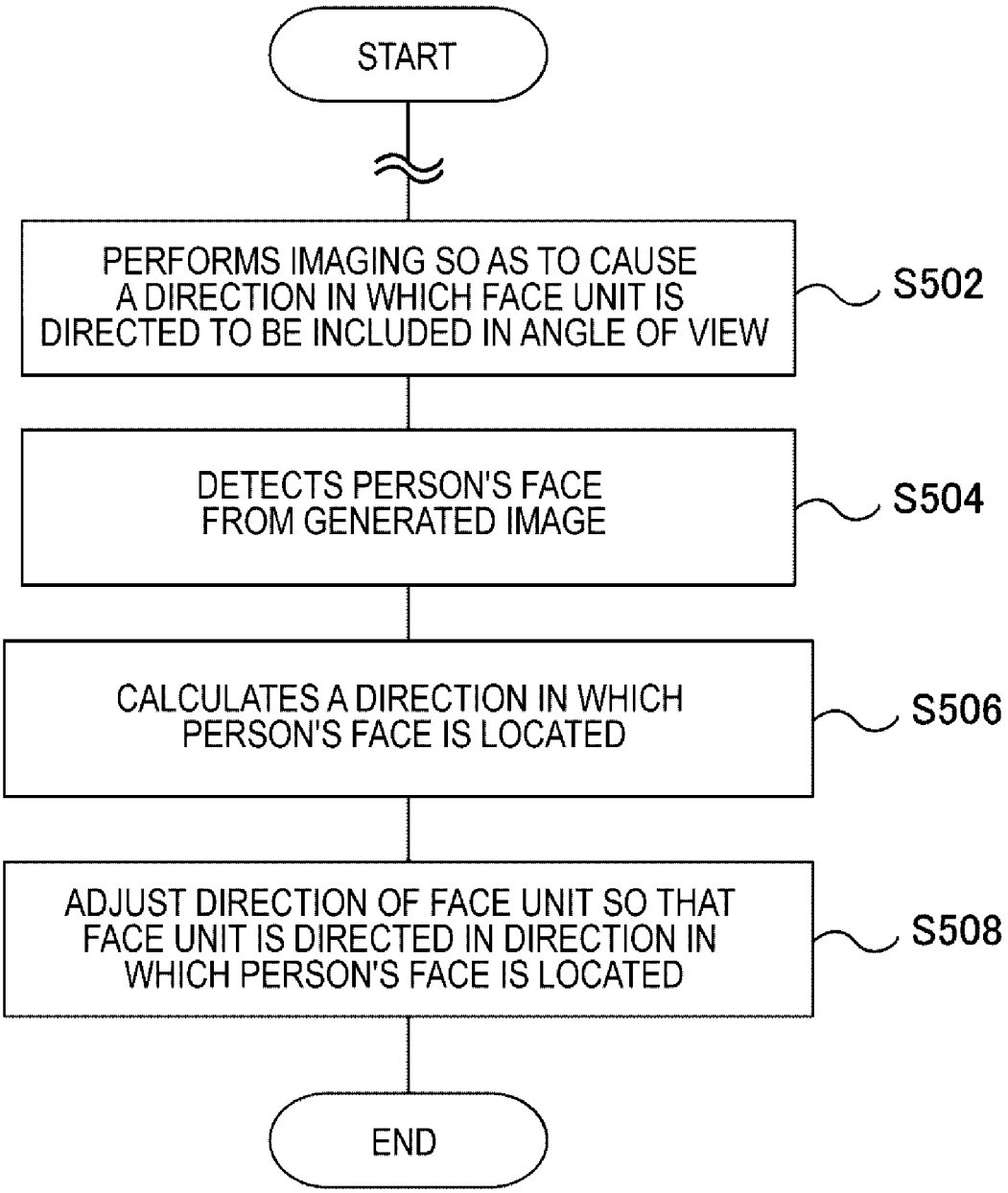
FIG. 14 is a flowchart illustrating a flow of a process performed by the robot according to Exemplary embodiment 5.

FIG. 14 is a flowchart illustrating a flow of a process performed by the robot 2000 of Exemplary embodiment 5. The robot 2000 of Exemplary embodiment 5 executes steps S102 to S106 of FIG. 3 and then performs processes in step S502 and the subsequent steps. For simplification of illustration, in FIG. 14, steps S102 to S106 are not illustrated.

In step S502, the imaging unit 2100 performs capturing with the angle of view thereof including a direction in which the face unit 2020 is directed. In step S504, the face detection unit 2120 detects a person's face from an image generated by the imaging unit 2100. In step S506, the face direction calculation unit 2140 calculates a direction in which the person's face is located on the basis of a detection region from the face detection unit 2120. In step S508, the face direction adjustment unit 2160 adjusts a direction of the face unit 2020 so that the face unit 2020 is directed in the direction in which the person's face is located, calculated by the face direction calculation unit 2140.

<Advantageous Effects>

If the imaging unit 2100 performs capturing without changing a direction of the face unit 2020 to a direction in which a person's head is located, it is possible that a person's face is not appropriately captured. For example, when the imaging unit 2100 performs capturing, it is possible that a person faces sideways or backward. In this case, it is difficult to detect the person's face from an image generated by the imaging unit 2100.

Therefore, the robot 2000 of Exemplary embodiment 5 changes a direction of the face unit 2020 to a direction in which a person's head is located and then performs capturing with the angle of view thereof including a direction in which the face unit 2020 is directed. As described above, if the robot 2000 of the present exemplary embodiment directs the face unit 2020 in a direction in which a person's head is located, there is a high probability that the person may voluntarily face toward the face unit 2020. Thus, in the robot 2000 of Exemplary embodiment 5, there is a high probability that an image generated by the imaging unit 2100 captures the person's face directed toward the front or in a direction close to the front. The face detection unit 2120 can therefore detect the person's face from the image with high probability.

In addition, the robot 2000 of Exemplary embodiment 5 adjusts a direction of the face unit 2020 to a direction in which a person's face is located. Thus, from the person's viewpoints, the person feels that the robot 2000 is directed toward the person more than a case where the face unit 2020 faces toward a portion in the person's head other than the face (the top of the head and the like). As a result, the person and the robot 2000 can perform more natural communication with each other.

<Modification Example 1>

Figure 15:
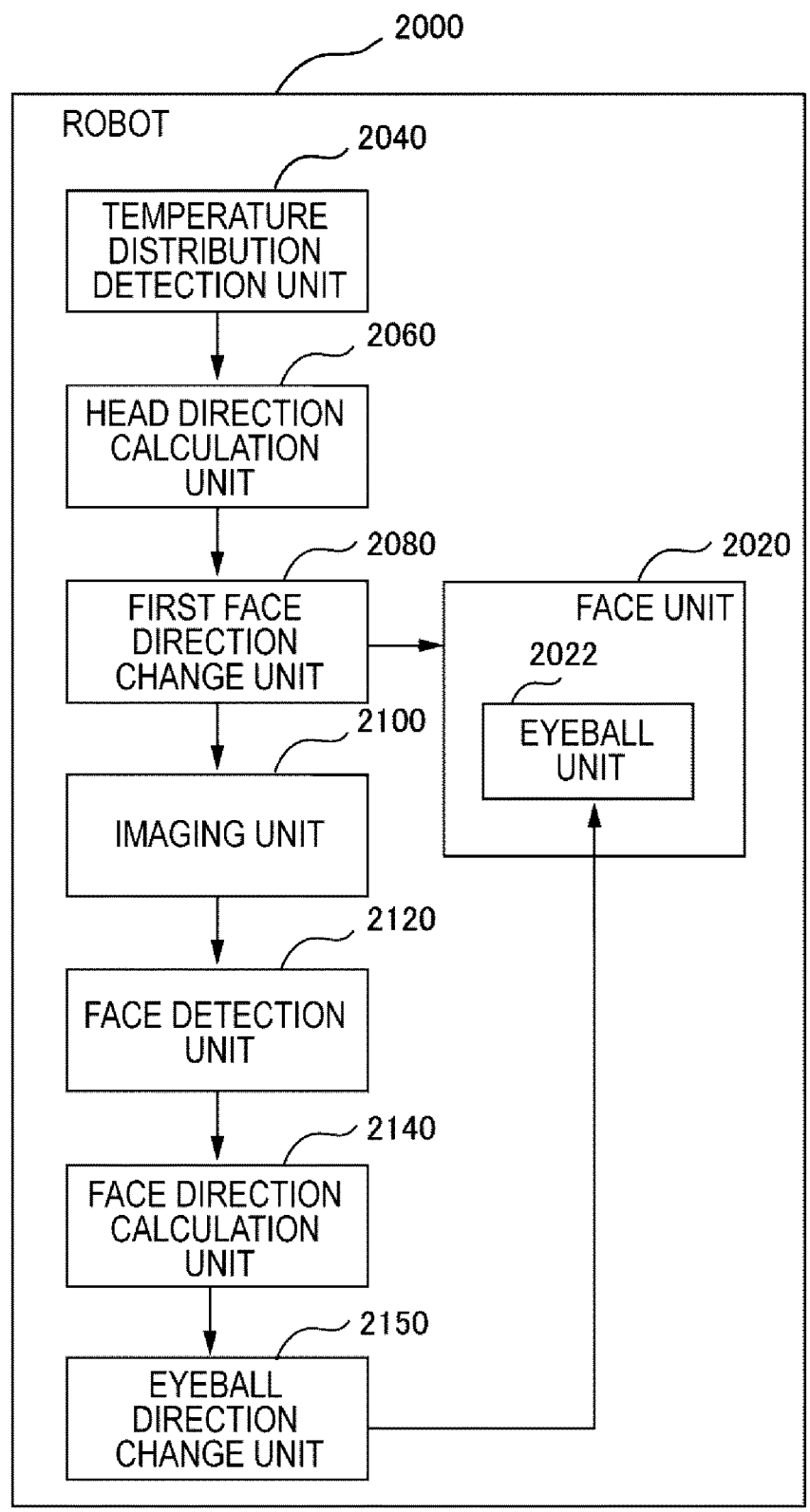
FIG. 15 is a block diagram illustrating a robot according to Modification Example 1.

FIG. 15 is a block diagram illustrating a robot 2000 of Modification Example 1. In FIG. 15, an arrow indicates a flow of information. In addition, in FIG. 15, each block indicates not a configuration in the hardware unit but a configuration in the function unit.

In the robot 2000 of Modification Example 1, the face unit 2020 includes an eyeball unit 2022. In addition, the robot 2000 of Modification Example 1 includes an eyeball direction change unit 2150 instead of the face direction adjustment unit 2160. Other function units of the robot 2000 of Modification Example 1 are the same as those of the robot 2000 of Exemplary embodiment 5.

The eyeball direction change unit 2150 directs the eyeball unit 2022 in a direction calculated by the face direction calculation unit 2140. By doing so, the person's viewpoints and the eyeball unit 2022 are directed toward each other. As a result, the person and the robot 2000 can perform natural communication with each other.

In addition, in Modification Example 1, the imaging unit 2100 is provided, for example, inside the eyeball unit 2022. However, the imaging unit 2100 may be provided at locations other than the eyeball unit 2022.

[Exemplary Embodiment 6]

Figure 16:
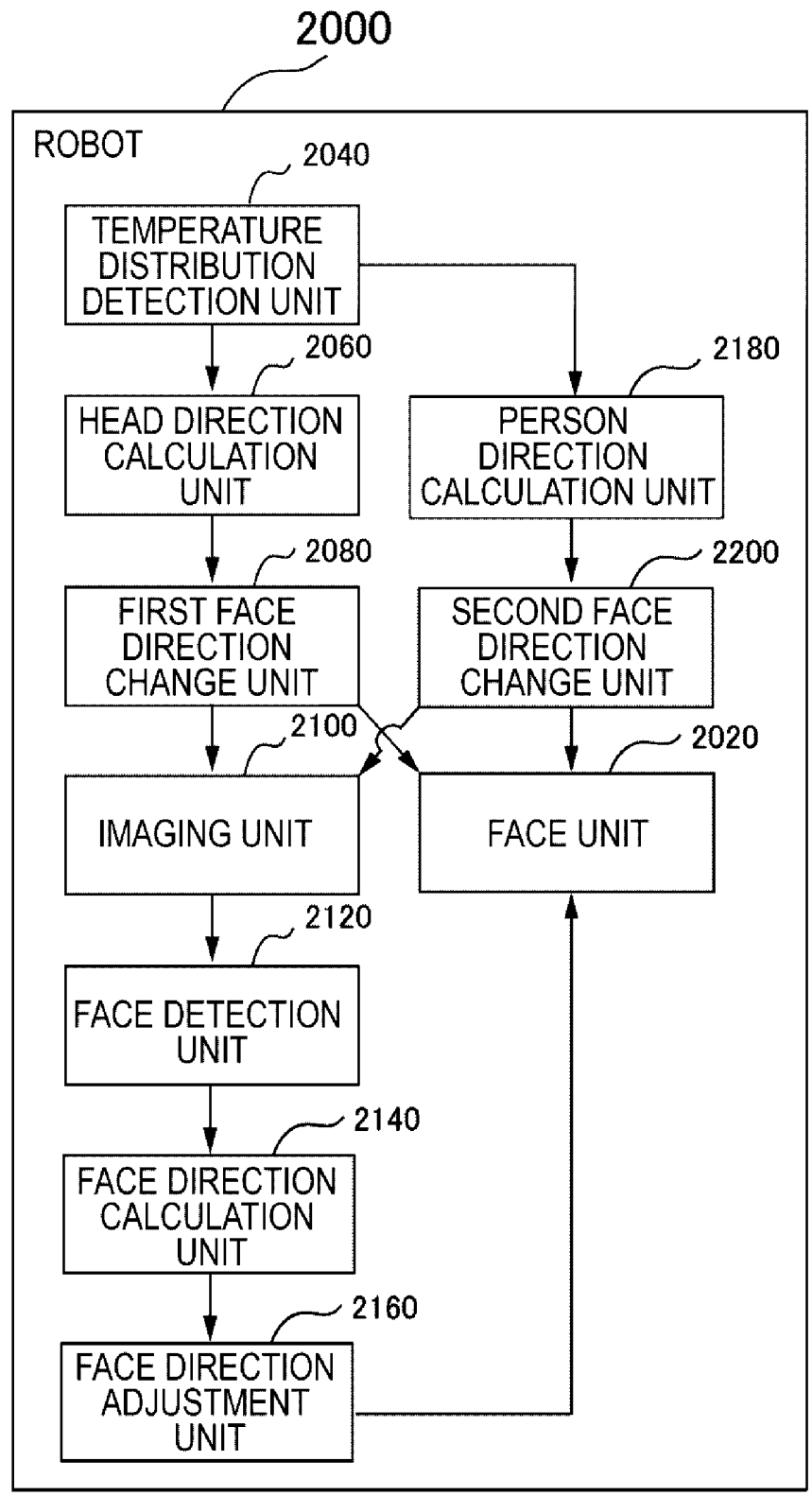
FIG. 16 is a block diagram illustrating a robot according to Exemplary embodiment 6.

FIG. 16 is a block diagram illustrating a robot 2000 according to Exemplary embodiment 6. In FIG. 16, an arrow indicates a flow of information. In addition, in FIG. 16, each block indicates not a configuration in the hardware unit but a configuration in the function unit.

In a case where a direction in which a person's head is located cannot be detected, the robot 2000 of Exemplary embodiment 6 detects a person's face by performing capturing for a plurality of directions in which it can be estimated that the person's head is located. In addition, the robot 2000 directs the face unit 2020 in a direction in which the person's face is located. For this, the robot 2000 of Exemplary embodiment 6 includes a person direction calculation unit 2180 and a second face direction change unit 2200. The robot 2000 of Exemplary embodiment 6 is the same as the robot 2000 of Exemplary embodiment 5 or Modification Example 1 except that the person direction calculation unit 2180 and the second face direction change unit 2200 are provided. FIG. 16 illustrates a case where a configuration of the robot 2000 is the same as the robot 2000 of Exemplary embodiment 5 except that the person direction calculation unit 2180 and the second face direction change unit 2200 are provided.

<Person Direction Calculation Unit 2180>

The person direction calculation unit 2180 calculates a direction in which a person is located on the basis of a temperature distribution detected by the temperature distribution detection unit 2040. For example, the person direction calculation unit 2180 calculates the direction in which the person is located on the basis of candidate cells specified from the temperature distribution detected by the temperature distribution detection unit 2040. For example, the person direction calculation unit 2180 calculates a central position of a plurality of candidate cells as the direction in which the person is located.

<Second Face Direction Change Unit 2200>

The second face direction change unit 2200 directs the face unit 2020 in a direction in which a person is located only in a case where the head direction calculation unit 2060 does not detect a direction in which the person's head is located, and the person direction calculation unit 2180 detects a direction in which the person is located.

For example, a case where the head direction calculation unit 2060 cannot determine cells corresponding to the direction in which the person's head is located from candidate cells is a situation in which the head direction calculation unit 2060 does not detect a direction in which a person's head is located. Suppose that the head direction calculation unit 2060 determines cells indicating a temperature included in a predetermined range among candidate cells, as cells corresponding to the direction in which the person's head is located. In this case, if there is no cell indicating the temperature included in the predetermined range, the head direction calculation unit 2060 cannot determine cells corresponding to the direction in which the person's head is located among the candidate cells.

In a case where a direction of the face unit 2020 is changed by the second face direction change unit 2200, the imaging unit 2100 performs capturing for a plurality of directions with the angle of view thereof including a direction in which the face unit 2020 is directed. By doing so, the imaging unit 2100 generates a plurality of images through capturing in different directions. For example, the imaging unit 2100 performs capturing in four cases: a case where an upper right corner of the angle of view including a direction in which the face unit 2020 is directed; a case where an upper left corner thereof including that; a case where a lower right corner thereof including that; and a lower left corner thereof including that. However, a method of that the imaging unit 2100 performs capturing multiple times is not limited to this method.

The face detection unit 2120 detects a person's face from the plurality of images generated by the imaging unit 2100. The face direction calculation unit 2140 calculates a direction in which the face is located with respect to the person's face detected by the face detection unit 2120. The face direction adjustment unit 2160 adjusts a direction of the face unit 2020 so that the face unit 2020 is directed in the direction calculated by the face detection unit 2120.

<Flow of Process>

Figure 17:
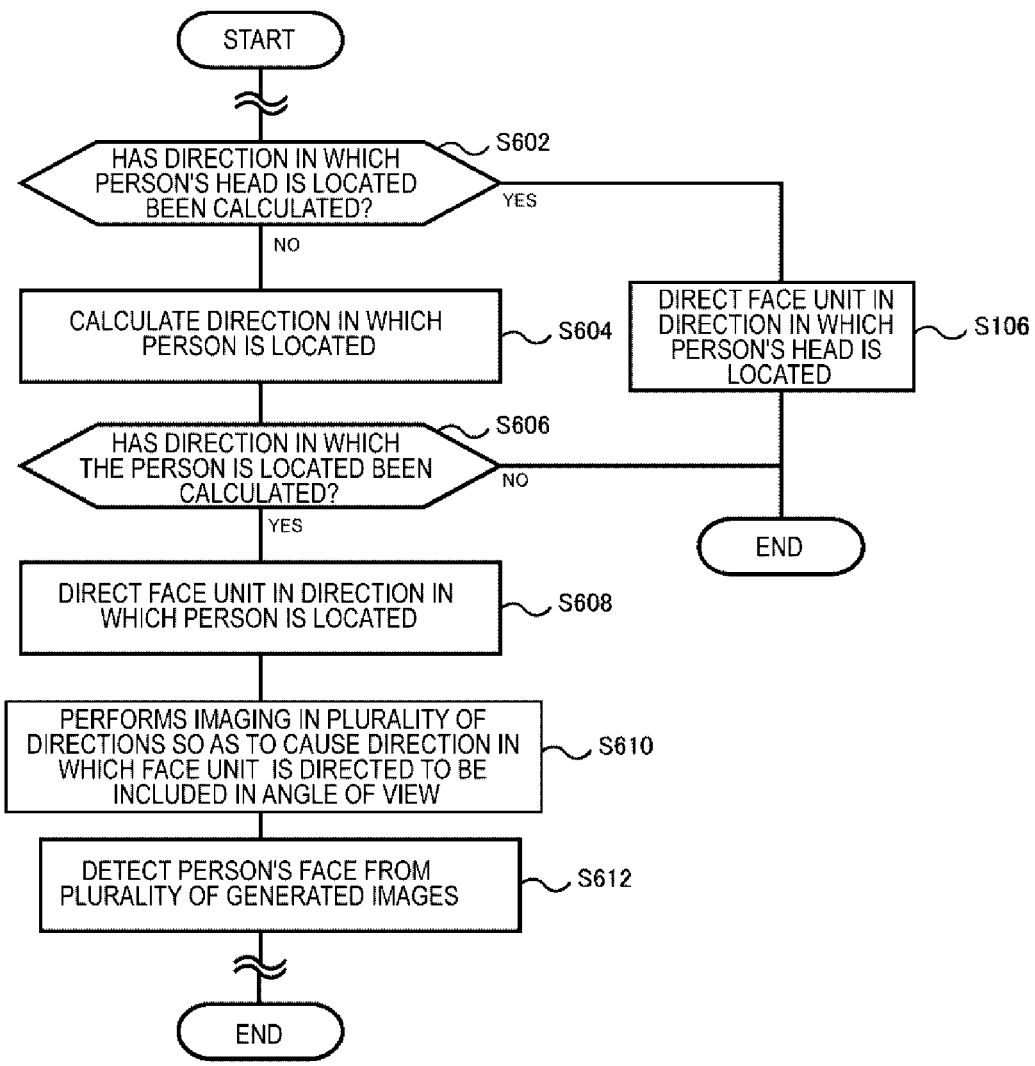
FIG. 17 is a flowchart illustrating a flow of a process performed by the robot according to Exemplary embodiment 6.

FIG. 17 is a flowchart illustrating a flow of a process performed by the robot 2000 of Exemplary embodiment 6. The robot 2000 of Exemplary embodiment 6 performs steps S102 and S104 of FIG. 3 and then executes respective steps illustrated in FIG. 17. In addition, the robot 2000 of Exemplary embodiment 6 executes the respective steps illustrated in FIG. 17, and then executes steps S506 and S508 illustrated in FIG. 14. For simplification of illustration, in FIG. 17, steps S102, S104, S506 and S508 are not illustrated.

In step S602, the robot 2000 determines whether or not the head direction calculation unit 2060 has calculated a direction in which a person's head is located. In a case where the head direction calculation unit 2060 has calculated a direction in which a person's head is located (step S602: YES), the process in FIG. 17 proceeds to step S106. On the other hand, in a case where the head direction calculation unit 2060 has not calculated a direction in which a person's head is located (step S602: NO), the process in FIG. 17 proceeds to step S604.

In step S604, the person direction calculation unit 2180 calculates a direction in which the person is located. In step S606, the robot 2000 determines whether or not the person direction calculation unit 2180 has calculated the direction in which the person is located. In a case where the person direction calculation unit 2180 has calculated the direction in which the person is located (step S606: YES), the process in FIG. 17 proceeds to step S608. On the other hand, in a case where the person direction calculation unit 2180 has not calculated the direction in which the person is located (step S606: NO), the process in FIG. 17 ends.

In step S608, the second face direction change unit 2200 directs the face unit 2020 in the direction in which the person is located. In step S610, the imaging unit 2100 performs capturing for a plurality of directions with an angle of view thereof including a direction in which the face unit 2020 is directed. In step S612, the face detection unit 2120 detects the person's face from a plurality of images generated by the imaging unit 2100.

<Advantageous Effects>

It is possible that a person's head is not included in a temperature distribution detected by the temperature distribution detection unit 2040. For example, there is a case where a detection region of the temperature distribution detection unit 2040 includes only portions under the person's neck. In this case, it is difficult for the robot 2000 to calculate a direction in which the person's head is located on the basis of the temperature distribution detected by the temperature distribution detection unit 2040.

According to the robot 2000 of the present exemplary embodiment, even in a case where it is difficult to calculate a direction in which a person's head is located on the basis of the temperature distribution detected by a temperature distribution detection unit 2040, the face unit 2020 of the robot 2000 can be directed in a direction in which a person's face is located. Thus, it is possible to further increase a probability that the person and the robot 2000 can perform natural communication with each other. In addition, an operation performed by the robot 2000 of Exemplary embodiment 6 corresponds to finding out the person's face by looking around the surroundings of a portion of the person when the portion is included in eyesight.

[Exemplary Embodiment 7]

A robot 2000 of Exemplary embodiment 7 has the same configuration as the configuration of the robot 2000 according to any one of above-described exemplary embodiments.

The head direction calculation unit 2060 of Exemplary embodiment 7 calculates a central direction of a plurality of heads in a case where the plurality of people's heads are detected from a temperature distribution detected by the temperature distribution detection unit 2040. Suppose that the head direction calculation unit 2060 determines cells indicating a temperature included in a predetermined range among candidate cells, as cells corresponding to the direction in which the person's head is located. In this case, if there are a plurality of candidate cells indicating the temperature included in the predetermined range, for example, the head direction calculation unit 2060 determines the plurality of candidate cells as cells corresponding to a direction in which the person's head is located. As a result, a plurality of people's heads are detected from the temperature distribution. Therefore, the head direction calculation unit 2060 calculates a central direction of the plurality of heads by calculating the center of the plurality of candidate cells.

In addition, the first face direction change unit 2080 directs the face unit 2020 in the central direction calculated by the head direction calculation unit 2060.

<Advantageous Effects>

There is a case where a plurality of people are present in a detection region of the temperature distribution detection unit 2040. According to the robot 2000 of the present exemplary embodiment, in this case, the face unit 2020 is directed in a central direction of the plurality of people's heads. Here, if the face unit 2020 is directed in the central direction of the plurality of people's heads, there is a high probability that each of the plurality of people faces toward the face unit 2020. The robot 2000 of the present exemplary embodiment can therefore perform natural communication with the plurality of people.

[Example]

Figure 18:
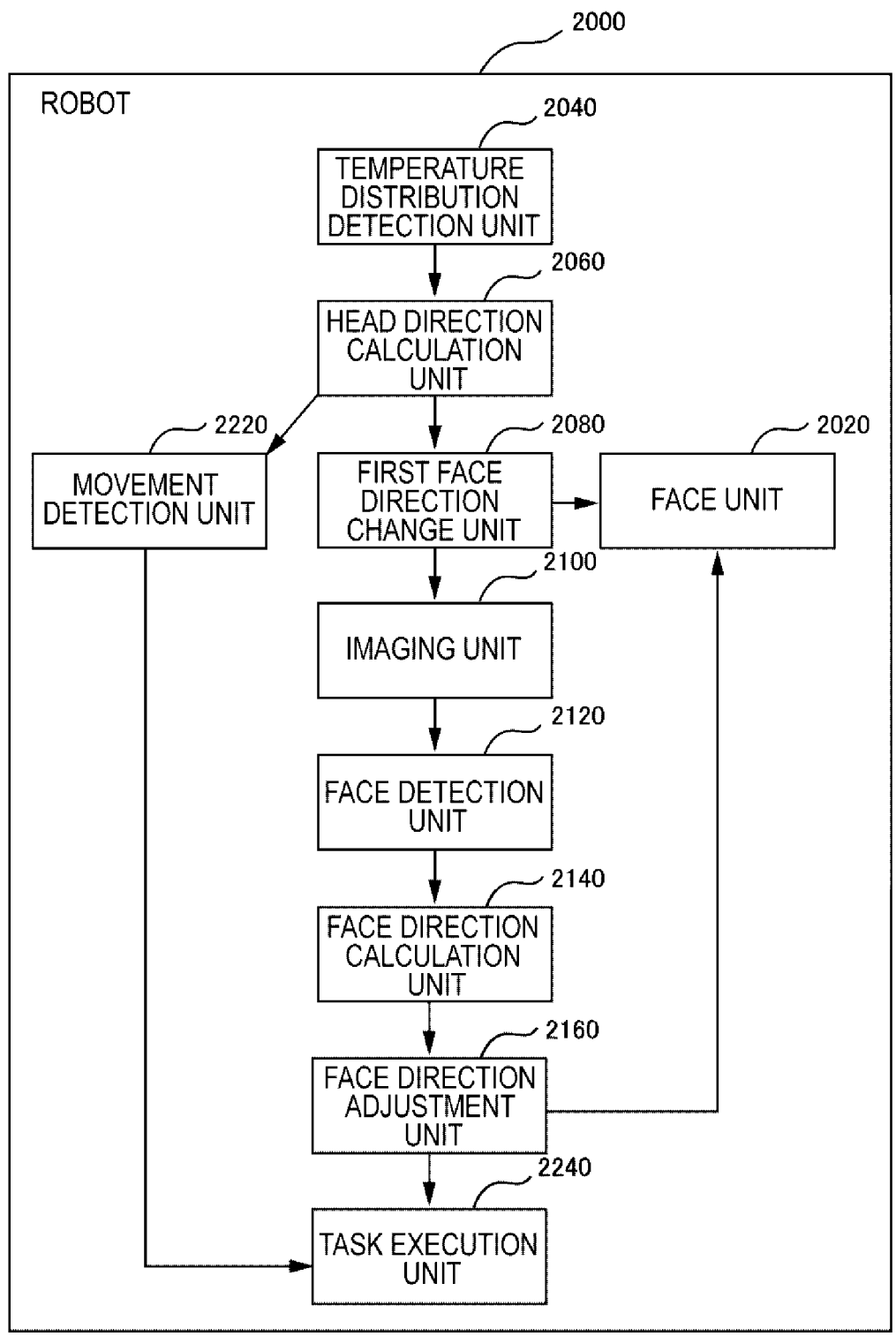
FIG. 18 is a block diagram illustrating a robot related to Example.

Hereinafter, Example of the robot 2000 will be described. FIG. 18 is a block diagram illustrating the robot 2000 according to Example. In FIG. 18, an arrow indicates a flow of information. In addition, in FIG. 18, each block indicates not a configuration in the hardware unit but a configuration in the function unit.

The robot 2000 of Example includes a movement detection unit 2220 and a task execution unit 2240 in addition to the functional constituent units included in the robot 2000 of Exemplary embodiment 5.

<Task Execution Unit 2240>

The task execution unit 2240 executes a predetermined task. For example, the predetermined task is an operation of talking to a person (for example, an operation of reproducing a voice message). In the above-described manner, the robot 2000 performs communication with the person.

The task execution unit 2240 executes the predetermined task after the face direction adjustment unit 2160 adjusts a direction of the face unit 2020, or after receiving an instruction from the movement detection unit 2220. An operation of the movement detection unit 2220 will be described below.

<Movement Detection Unit 2220>

The movement detection unit 2220 emits ultrasonic waves to a region including a direction in which the face unit 2020 is directed. In addition, the movement detection unit 2220 detects the ultrasonic waves reflected from an object. In a case where the reflected ultrasonic waves are detected, the movement detection unit 2220 calculates a distance between the robot 2000 and the object which has reflected the ultrasonic waves on the basis of a time point at which the ultrasonic waves are output and a time point at which the returned ultrasonic waves are detected.

The movement detection unit 2220 repeatedly performs the above-described series of operations so as to determine whether or not the object is moving toward the robot 2000. In addition, in a case where the object is moving toward the robot 2000, the movement detection unit 2220 instructs the task execution unit 2240 to execute the predetermined task.

There is a case where the robot 2000 cannot detect a person's face from an image generated by the imaging unit 2100. For example, in a case where the robot 2000 is provided in a dark place, it is difficult to detect a person's face from an image generated by the imaging unit 2100.

The robot 2000 of the present example executes the predetermined task not only in a case where the face direction adjustment unit 2160 adjusts a direction of the face of the face unit 2020 but also in a case where the movement detection unit 2220 detects that an object is moving toward the robot 2000. In a case where the object is moving toward the robot 2000, the movement detection unit 2220 handles the object as a person and causes the task execution unit 2240 to execute the predetermined task. In the above-described way, the robot 2000 executes the predetermined task when it is predicted that there is a person, even in a case where the person's face cannot be detected from an image obtained through capturing in a direction in which the face unit 2020 is directed. It can therefore increase a probability that the robot 2000 and the person can perform communication with each other.

The robot 2000 of the present example has a configuration in which the movement detection unit 2220 and the task execution unit 2240 are additionally provided in the configuration of the robot 2000 of Exemplary embodiment 5. However, the robot 2000 may be implemented by additionally providing the movement detection unit 2220 or the task execution unit 2240 in the robot 2000 of other exemplary embodiments or the modification example. For example, when the movement detection unit 2220 and the task execution unit 2240 are additionally provided in the robot 2000 of Exemplary embodiments 1 to 4, the robot 2000 executes a predetermined task by using the task execution unit 2240, if the movement detection unit 2220 determines that an object is moving toward the robot 2000. In addition, the robot 2000 may execute a predetermined task by using the task execution unit 2240, when the first face direction change unit 2080 changes a direction of the face unit 2020 to a direction in which a person's head is located.

Further, when the movement detection unit 2220 and the task execution unit 2240 are additionally provided in the robot 2000 of the modification example, the robot 2000 executes a predetermined task by using the task execution unit 2240 if the movement detection unit 2220 determines that an object is moving toward the robot 2000, or after the eyeball direction change unit 2150 operates, for example.

Still further, when the movement detection unit 2220 and the task execution unit 2240 are additionally provided in the robot 2000 of Exemplary embodiment 6, the robot 2000 executes a predetermined task by using the task execution unit 2240 if the movement detection unit 2220 determines that an object is moving toward the robot 2000, or after the face direction adjustment unit 2160 operates, for example.

When the movement detection unit 2220 and the task execution unit 2240 are additionally provided in the robot 2000 of Exemplary embodiment 7, the robot 2000 performs the same operation as in the case where the movement detection unit 2220 and the task execution unit 2240 are additionally provided in the robot 2000 of any one of Exemplary embodiments 1 to 6 and the modification example.

As mentioned above, the exemplary embodiments of the present invention have been described, but the exemplary embodiments are only examples of the present invention, and combinations of the exemplary embodiments and various configurations other than the exemplary embodiments may be employed.

For example, the robot 2000 including the face direction adjustment unit 2160 may include the eyeball direction change unit 2150 described in the robot 2000 of the modification example instead of the face direction adjustment unit 2160. In this case, the robot 2000 directs the eyeball unit 2022 in a direction in which a person's head is located instead of adjusting a direction of the face unit 2020 so that the direction of the face unit is directed in the direction in which the person's face is located. In addition, in this case, the face unit 2020 includes the eyeball unit 2022.

This application is based upon and claims the benefit of priority from Japanese Patent Application No. 2013-200879, filed Sep. 27, 2013; the entire contents of which are incorporated herein by reference.

What is claimed is:

1. A robot comprising:
    a face unit including an eyeball unit;
    a temperature distribution detection unit detecting a temperature distribution of a detection region by using a plurality of photo-detectors disposed in a grid form;
    a head direction calculation unit calculating a direction in which a person's head is located, on the basis of the temperature distribution; and
    a first face direction change unit directing the face unit in the direction calculated by the head direction calculation unit;
    an imaging unit generating an image by performing capturing when the first face direction change unit changes a direction of the face unit, and angle of view of the imaging unit includes a direction in which the face unit is directed;
    a face detection unit detecting a person's face from the image; and
    a face direction calculation unit calculating a direction in which the person's face is located, on the basis of a detection result of the face detection unit,
    wherein the robot further includes at least one of:
        an eyeball direction change unit directing the eyeball unit in the direction calculated by the face direction calculation unit; and
        a face direction adjustment unit that adjusts a direction of the face unit so that the face unit is directed in the direction calculated by the face direction calculation unit.

2. The robot according to claim 1, wherein the head direction calculation unit includes:
    a reference temperature distribution storage unit storing a reference temperature distribution;
    a candidate position determination unit determining candidate positions in the temperature distribution, an absolute value of a difference between the temperature indicated by the candidate position and the reference temperature distribution being equal to or greater than a predetermined value;
    a head position determination unit determining a position corresponding to a direction in which a person's head is located among the candidate positions; and
    a direction calculation unit calculates the direction in which the person's head is located, on the basis of the position determined by the head position determination unit.

3. The robot according to claim 2,
    wherein the temperature distribution detection unit repeatedly detects the temperature distribution of the same detection region, and
    wherein the head direction calculation unit includes a reference temperature distribution update unit updating the reference temperature distribution stored in the reference temperature distribution storage unit, on the basis of the temperature distribution.

4. The robot according to claim 2,
    wherein the temperature distribution detection unit repeatedly detects the temperature distribution of the same detection region,
    wherein the head direction calculation unit includes:
    a sorting unit dividing the candidate positions determined from the temperature distribution into groups; and
    a movement determination unit determining whether or not the group is moving for each group divided by the sorting unit, by comparing with each other the same groups in a plurality of the respective temperature distributions, and
    wherein the head position determination unit determines a position corresponding to a direction in which a person's head is located, among positions in the temperature distribution which are included in the group determined as moving.

5. The robot according to claim 1, further comprising:
    a person direction calculation unit calculating a direction in which a person is located, on the basis of the temperature distribution; and
    a second face direction change unit directing the face unit in the direction in which the person is located only when the head direction calculation unit does not calculate a direction in which the person's head is located and the person direction calculation unit calculates the direction in which the person is located,
    wherein the imaging unit generates a plurality of images by performing capturing in a plurality of directions when the second face direction change unit changes a direction of the face unit, an angle of view of the imaging unit including a direction in which the face unit is directed, and wherein the face detection unit detects the person's face from the plurality of images generated by the imaging unit.

6. The robot according to claim 1, wherein, when a plurality of directions in which the person's head is located are calculated on the basis of the same temperature distribution, the head direction calculation unit calculates a central direction of the calculated plurality of directions, and wherein the first face direction change unit directs the face unit in the central direction.

7. A control method executed by a computer controlling a robot including a face unit and a temperature distribution detection unit that detects a temperature distribution of a detection region by using a plurality of photo-detectors disposed in a grid form, the control method comprising:

calculating a direction in which a person's head is located, on the basis of the temperature distribution; and directing the face unit in the direction calculated in the step of calculating a direction in which a person's head is located, wherein the face unit includes an eyeball unit, wherein the robot includes an imaging unit performing capturing to generate an image, and wherein the control method further includes:

causing the imaging unit to perform capturing when a direction of the face unit is changed in the step of directing the face unit, an angle of view of the imaging unit including a direction in which the face unit is directed;

detecting a person's face from the image generated in the step of causing the imaging unit to perform capturing;

calculating a direction in which the person's face is located, on the basis of a detection result in the step of detecting the person's face; and at least one of:

directing the eyeball unit in the direction calculated in the step of calculating the direction in which the person's face is located, and adjusting the direction of the face unit so that the face unit is directed in the direction calculated in the step of calculating the direction in which the person's face is located.

8. The control method according to claim 7, wherein the computer includes a reference temperature distribution storage unit storing a reference temperature distribution, and wherein the step of calculating a direction in which a person's head is located includes:

determining candidate positions in the temperature distribution, an absolute value of a difference between the temperature indicated by the candidate position and the reference temperature distribution being equal to or greater than a predetermined value;

determining a position corresponding to a direction in which a person's head is located among the candidate positions; and calculating the direction in which the person's head is located on the basis of the position specified in the step of determining a position corresponding to a direction in which a person's head is located.

9. The control method according to claim 8, wherein the temperature distribution detection unit repeatedly detects the temperature distribution of the same detection region, and wherein the step of calculating a direction in which a person's head is located includes updating the reference temperature distribution stored in the reference temperature distribution storage unit, on the basis of the temperature distribution.

10. The control method according to claim 8, wherein the temperature distribution detection unit repeatedly detects the temperature distribution of the same detection region, wherein the step of calculating a direction in which a person's head is located includes:

dividing the candidate positions determined from the temperature distribution into groups; and determining whether or not the group is moving for each group divided in the step of dividing the candidate positions, by comparing with each other the same groups in a plurality of the respective temperature distributions, and wherein, in the step of determining a position corresponding to a direction in which a person's head is located, a position corresponding to a direction in which a person's head is located is determined, among positions in the temperature distribution which are included in the group determined as moving.

11. The control method according to claim 7, further comprising:

calculating a direction in which a person is located, on the basis of the temperature distribution; and directing the face unit in the direction in which the person is located only when a direction in which the person's head is located is not calculated in the step of calculating a direction in which a person's head is located and the direction in which the person is located is calculated in the step of calculating a direction in which a person is located, wherein, in the step of causing the imaging unit to perform capturing, the imaging unit is caused to perform capturing in a plurality of directions when a direction of the face unit is changed in the second step of directing the face unit in the direction in which the person is located, an angle of view of the imaging unit including a direction in which the face unit is directed, and wherein, in the step of detecting a person's face, the person's face is detected from a plurality of images generated in the step of causing the imaging unit to perform capturing.

12. The control method according to claim 7, wherein, when a plurality of directions in which the person's head is located are calculated on the basis of the same temperature distribution, a central direction of the calculated plurality of directions in the step of calculating a direction in which a person's head is located, and wherein, in the first step of directing the face unit, the face unit is directed in the central direction.

13. A non-transitory computer-readable storage medium storing a program causing a computer to control a robot including a face unit and a temperature distribution detection unit that detects a temperature distribution of a detection region by using a plurality of photo-detectors disposed in a grid form, the program causing the computer to execute:

calculating a direction in which a person's head is located, on the basis of the temperature distribution; and directing the face unit in the direction calculated in the step of calculating a direction in which a person's head is located, wherein the face unit includes an eyeball unit, wherein the robot includes an imaging unit performing capturing to generate an image, and wherein the program causes the computer to further execute:

causing the imaging unit to perform capturing when a direction of the face unit is changed in the step of directing the face unit, an angle of view of the imaging unit including a direction in which the face unit is directed;

detecting a person's face from the image generated in the step of causing the imaging unit to perform capturing;

calculating a direction in which a person's face is located, on the basis of a detection result obtained by a face detection function; and at least one of:
- an eyeball direction change function of directing the eyeball unit in the direction calculated in the step of detecting the person's face, and
- adjusting the direction of the face unit so that the face unit is directed in the direction calculated in the step of calculating the direction in which the person's face is located.

14. The storage medium according to claim 13,
wherein the computer includes a reference temperature distribution storage unit storing a reference temperature distribution, and
wherein the step of calculating a direction in which a person's head is located includes:
determining candidate positions in the temperature distribution, an absolute value of a difference between the temperature indicated by the candidate position and the reference temperature distribution being equal to or greater than a predetermined value;
determining a position corresponding to a direction in which a person's head is located among the candidate positions; and
calculating the direction in which the person's head is located on the basis of the position specified in the step of determining a position corresponding to a direction in which a person's head is located.

15. The storage medium according to claim 14,
wherein the temperature distribution detection unit repeatedly detects the temperature distribution of the same detection region, and
wherein the step of calculating a direction in which a person's head is located includes updating the reference temperature distribution stored in the reference temperature distribution storage unit, on the basis of the temperature distribution.

16. The storage medium according to claim 14,
wherein the temperature distribution detection unit repeatedly detects the temperature distribution of the same detection region,
wherein the step of calculating a direction in which a person's head is located includes:
dividing the candidate positions determined from the temperature distribution into groups; and
determining whether or not the group is moving for each group divided in the step of dividing the candidate positions, by comparing with each other the same groups in a plurality of the respective temperature distributions, and
wherein, in the step of determining a position corresponding to a direction in which a person's head is located, a position corresponding to a direction in which a person's head is located is determined, among positions in the temperature distribution which are included in the group determined as moving.

17. The storage medium according to claim 13, causing the computer to further execute:
calculating a direction in which a person is located, on the basis of the temperature distribution; and
directing the face unit in the direction in which the person is located only when a direction in which the person's head is located is not calculated by a head direction calculation function and the direction in which the person is located is calculated in the step of calculating a direction in which a person's head is located,
wherein, in the step of causing the imaging unit to perform capturing, the imaging unit is caused to perform capturing in a plurality of directions when a direction of the face unit is changed in the second step of directing the face unit in the direction in which the person is located, an angle of view of the imaging unit including a direction in which the face unit is directed, and
wherein, in the step of detecting a person's face, the face detection function causes the person's face is detected from a plurality of images generated in the step of causing the imaging unit to perform capturing.

18. The storage medium according to claim 13,
wherein when a plurality of directions in which the person's head is located are calculated on the basis of the same temperature distribution, in the step of calculating a direction in which a person's head is located, a central direction of the calculated plurality of directions is calculated, and
wherein, in the first step of directing the face unit, the face unit is directed in the central direction.

* * * * *